(12) United States Patent
Shelksohn et al.

(10) Patent No.: US 11,341,088 B2
(45) Date of Patent: *May 24, 2022

(54) ELECTRONIC FILE FORMAT MODIFICATION AND OPTIMIZATION

(71) Applicant: StubHub, Inc., San Francisco, CA (US)

(72) Inventors: Marcus Shelksohn, Emeryville, CA (US); Khashayar Dehdashtinejad, Walnut Creek, CA (US); Srinivas Nowduri, San Jose, CA (US)

(73) Assignee: StubHub, Inc., San Francisco, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/924,154

(22) Filed: Jul. 8, 2020

(65) Prior Publication Data

US 2020/0341944 A1   Oct. 29, 2020

Related U.S. Application Data

(63) Continuation of application No. 15/721,442, filed on Sep. 29, 2017, now Pat. No. 10,740,285.

(Continued)

(51) Int. Cl.
  *G06F 16/11* (2019.01)
  *G06F 16/13* (2019.01)

(52) U.S. Cl.
  CPC ............ *G06F 16/116* (2019.01); *G06F 16/13* (2019.01)

(58) Field of Classification Search
  USPC ........................................................ 707/781
  See application file for complete search history.

(56) References Cited

U.S. PATENT DOCUMENTS 6,067,532 A     5/2000  Gebb
10,740,285 B2   8/2020  Shelksohn
               (Continued)

FOREIGN PATENT DOCUMENTS

WO      2018/064678 A1    4/2018

OTHER PUBLICATIONS

Australian First Examination Report, as issued in connection with Australian Application No. 2017337144, dated Dec. 23, 2019, 3 pgs.

(Continued)

*Primary Examiner* — Cam Linh T Nguyen
(74) *Attorney, Agent, or Firm* — McDermott Will & Emery LLP

(57) ABSTRACT

A method of electronic file format conversion and optimization includes requesting a second set of information following receipt of a first set of information used to transfer an electronic file on a website. The method includes receiving the second set of information from a first computing device associated with a first entity. The method includes receiving user input from a second computing device associated with a second entity that initiates transfer of the electronic file from the first computing device to the second computing device. In response to additional user input from the second computing device used to access the electronic file, the method includes accessing an additional set of information related to the electronic file and converting the electronic file to an optimized file based on the second information and the additional information. At least a version of the optimized file being formatted for display on the second computing device.

20 Claims, 17 Drawing Sheets

Related U.S. Application Data

(60) Provisional application No. 62/402,814, filed on Sep. 30, 2016.

(56) References Cited

U.S. PATENT DOCUMENTS

| | | |
|---|---|---|
| 2003/0048909 A1 | 3/2003 | MacKenzie et al. |
| 2003/0093387 A1 | 5/2003 | Nakfoor |
| 2003/0216973 A1 | 11/2003 | Walker et al. |
| 2006/0111967 A1 | 5/2006 | Forbes |
| 2012/0078667 A1 | 3/2012 | Denker |
| 2012/0265564 A1 | 10/2012 | McCarthy et al. |
| 2012/0290336 A1 | 11/2012 | Rosenblatt et al. |
| 2013/0159026 A1* | 6/2013 | Rogel .................... G06Q 10/02 |
| | | 705/5 |
| 2013/0238372 A1 | 9/2013 | Jordan |
| 2014/0100896 A1 | 4/2014 | Du et al. |
| 2014/0249868 A1* | 9/2014 | Muralidhar ............ G06Q 40/04 |
| | | 705/5 |
| 2015/0088770 A1 | 3/2015 | Gelfand et al. |
| 2015/0193701 A1 | 7/2015 | Sohn et al. |
| 2016/0044203 A1 | 2/2016 | Paul et al. |
| 2016/0142382 A1 | 5/2016 | Ziebell |
| 2018/0018595 A1 | 1/2018 | Scott |

OTHER PUBLICATIONS

Australian First Examination Report, as issued in connection with Australian Application No. 2017337144, dated Jun. 29, 2020, 3 pgs.
Australian First Examination Report, as issued in connection with Australian Application No. 2017337144, dated Nov. 3, 2020, 5 pgs.
Extended European Search Report, as issued in connection with European Application No. 17857624.5, dated Apr. 6, 2020, 8 pgs.
International Search Report and Written Opinion received for PCT Application No. PCT/US2017/054793, dated Jan. 19, 2018, 15 pgs.

* cited by examiner

ELECTRONIC FILE FORMAT MODIFICATION AND OPTIMIZATION

CROSS-REFERENCE TO RELATED APPLICATIONS

This application is a continuation of U.S. patent application Ser. No. 15/721,442, filed on Sep. 29, 2017; which claims the benefit of U.S. Patent Application Ser. No. 62/402,814, filed on Sep. 30, 2016; the disclosures of which are incorporated herein by reference in their entireties.

FIELD

The embodiments discussed herein are related to electronic file format modification and optimization.

BACKGROUND

On internet-centric systems such as online ticket marketplaces, electronic files representative of tickets to events and data related to the files may be transferred between users. Indeed, online ticket marketplaces and similar websites provide a convenient forum via which buyers and sellers may exchange the files representative of tickets. Generally, the files are exchanged between users on secondary websites such as a secondary online ticket marketplace. The files representative of the tickets may have been purchased from a primary marketplace. However, the files may be restricted or limited, which may make an exchange, on the secondary website such as the secondary online ticket marketplace, difficult.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of electronic file format conversion including requesting, by a secondary server, a second set of information following receipt of a first set of information used to transfer an electronic file on a website. The method may include receiving, at the secondary server, the second set of information from a first computing device that is associated with a first entity. The method may include receiving, at the secondary server, user input from a second computing device that is associated with a second entity. The user input initiating transfer of the electronic file from the first computing device to the second computing device. In response to additional user input from the second computing device used to access the electronic file, the method may include accessing, by the secondary server, an additional set of information related to the electronic file and converting, by the secondary server, the electronic file to an optimized file based on the second set of information and the additional set of information. At least a version of an optimized file is formatted for display on the second computing device.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DETAILED DESCRIPTION OF SOME EXAMPLE EMBODIMENTS

Figure 1:
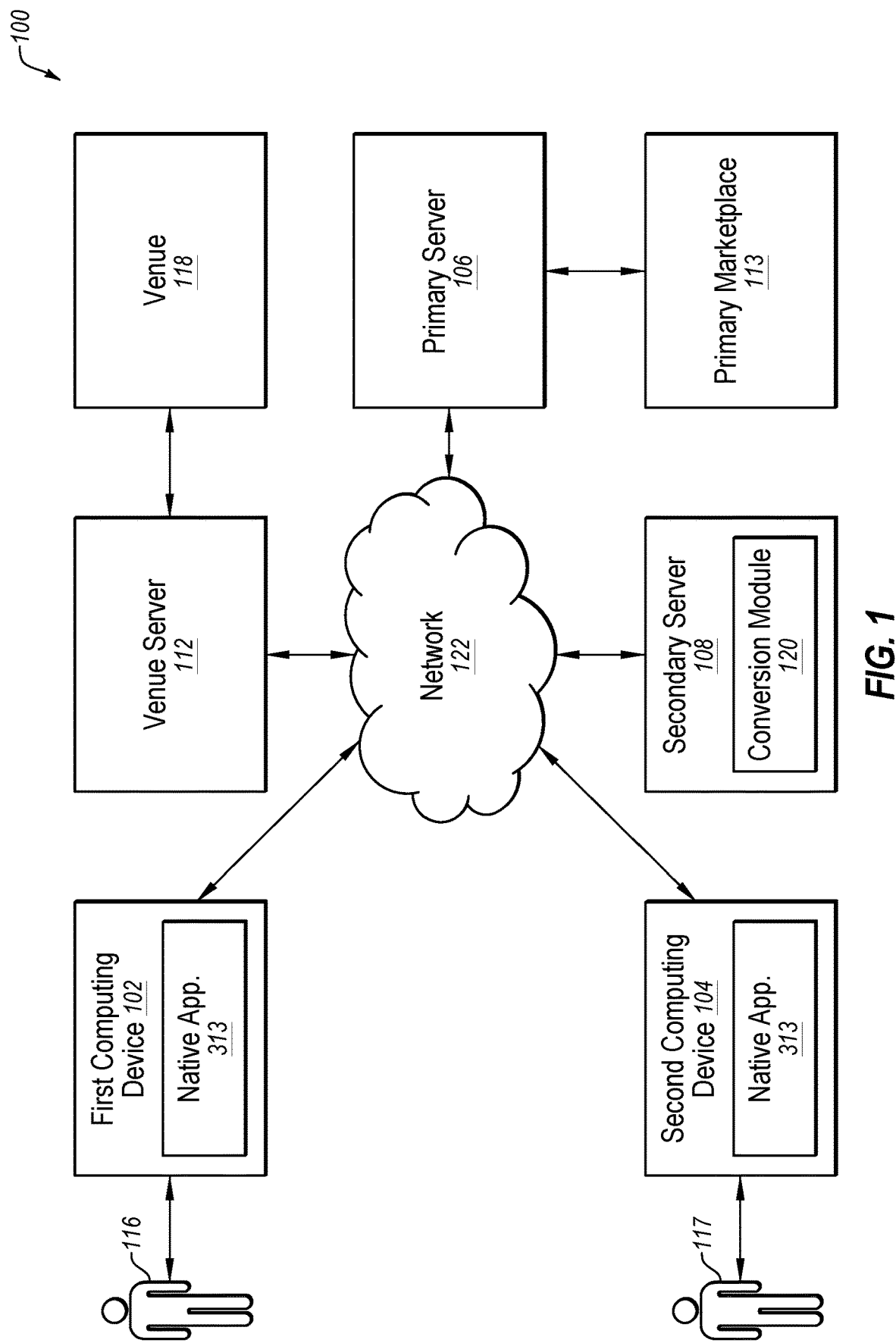
FIG. 1 illustrates an example operating environment.

Electronic and internet-based transfer of electronic files and/or data related to the electronic files may be restricted. For instance, a first electronic version of a file may be issued to a user. The user may wish to transfer the file to another user via a computing network such as the Internet or a telecommunications network. The issued first electronic version of the file may be subject to some sharing restrictions. Some options available to transfer the file may include taking an image or a screen shot of the file. However, the photographic version or screen-shot version of the file may omit some data or be otherwise unacceptable for use. Accordingly, the file may be inadequate to convey certain information included in the first electronic version. Accordingly, some embodiments described in the present disclosure overcome this technological problem through generation of an optimized file. The optimized file may have a format that overcomes the restrictions and includes information necessary for use of the file.

For example, in secondary online ticket markets, sales of tickets or electronic files representative of the tickets may be limited based on information that a seller can readily access. For instance, primary marketplaces (e.g., TICKETMASTER®) may restrict access to paper copies of the tickets. The primary marketplaces may accordingly only provide a mobile electronic version of a ticket, which may prevent or frustrate sale of the ticket in a secondary online ticket marketplace. Additionally, a venue may only allow entry to an event with a paper copy of the ticket. Accordingly, a buyer in a secondary ticket marketplace may wish to have access to a paper copy of a ticket, which may be difficult in online ticket marketplaces. Furthermore, transactions in the secondary online ticket marketplace may occur within a few days or a few hours of an event. Accordingly, the seller may not have adequate time to obtain additional documentation (e.g., print out a paper copy, etc.) to meet minimum ticket information restrictions of the secondary online ticket marketplace.

Thus, this above-described technical problem may be addressed by one or more embodiments described in the present disclosure. For instance, some embodiments disclosed herein provide to a buyer in a secondary online ticket marketplace a ticket or an electronic file representative thereof in an optimized form. The optimized form may enable admission to an event and overcomes measures implemented to prevent sales on the secondary online ticket marketplace. Additionally, the ticket in the optimized form is generated based on less than all ticket information provided by the seller and may be generated on the fly during or immediately following a transaction for the ticket.

Additionally, in secondary online ticket marketplaces, there are issues of forgery. For example, a single seller may sell or attempt to sell a single ticket multiple times to multiple buyers. By limiting an amount of information provided to the secondary online ticket marketplace, the seller may increase chances of successfully completing one or more fraudulent transactions. Thus, another example technical problem addressed in the present application is the providing to the buyer in the secondary online ticket marketplace the ticket in the optimized form while accounting for the issues of forgery.

Moreover, the portion of the ticket information provided to the secondary ticket marketplace may be different depending on what information is provided to the seller from the primary ticket marketplace. Thus, another example technical problem addressed in the present application may include providing the optimized ticket to the buyer based on different ticket information input from the seller.

Accordingly, in embodiments described in this disclosure, a secondary online ticket marketplace may be configured to receive only a portion of ticket information from a seller. The secondary online ticket marketplace may then convert the portion of ticket information to tickets that are usable by the buyer for entry into an event. Through conversion of the portion of ticket information to the tickets, the secondary online ticket marketplace may enable the seller to provide imperfect or incomplete ticket information, perform some verification processes, and provide to a buyer a usable, optimized ticket. The optimized ticket may be suitable for access via a marketplace application (e.g., STUBHUB®) hosted by a secondary ticket marketplace server. Additionally, the optimized ticket may be suitable for use as a mobile ticket using a smart device and/or a native application loaded on a mobile device. The mobile ticket may display sufficient information such that a display of a mobile device may be scanned (e.g., via barcode or quick response (QR) code technology) at a venue to permit entry to an event. Thus, the sale of the ticket may be facilitated despite restrictions to access to ticket information by the primary marketplace and may substantially prevent security concerns. Moreover, the buyer may receive the optimized ticket that conveniently delivers the ticket information to a venue for an event.

The technical problems addressed in the present disclosure and solutions to these technical problems arise necessarily in computer technology. For example, conversion and transfer of tickets from digital or electronic form to tangible forms and vice versa arises only in computer technologies. Digital and electronic tickets (e.g., mobile tickets) may not be exchanged between individuals without computing systems. Moreover, exchange of digital and electronic tickets via a computer network introduces issues of transfer of a ticket in an improper electrical format, which may be rejected by a venue. Accordingly, the claimed solution is necessarily rooted in computer technology to overcome a problem specifically arising in the realm of computer networks in which tickets are exchanged.

These and other embodiments are described with reference to the appended drawings in which like numbers indicate like features and structures unless described otherwise.

FIG. 1 illustrates an example operating environment (operating environment) 100. In the operating environment 100 of FIG. 1, a secondary server 108 may facilitate transactions involving a ticket or an electronic file representative of a ticket from a seller 116 to a buyer 117. For example, the seller 116 may create a listing for the ticket that the seller 116 desires to sell in the operating environment 100 via entry of user input into a first computing device 102 and/or a secondary server 108.

The ticket may include any documentary instrument (electronic, paper, digital, etc.) affording a holder an entry right or participation right to an event. The ticket may have been purchased earlier using a primary server 106 of a primary marketplace 113 (e.g., TICKETMASTER®). The listing may include information such as a location of a venue (e.g. 118), a price, a date, a seat location, and the like. The listing may be posted on a website and/or marketplace application hosted by the secondary server 108. When posted, the listing can be searched and/or accessed by the buyer 117. The buyer 117 may then respond to the listing. For instance, the buyer 117 may provide user input that indicates the buyer 117 wishes to purchase the ticket in the listing. The secondary server 108 may then execute a transaction for the ticket and provide to the buyer 117, or a buyer device 104 associated with the buyer 117, a ticket.

To create the listing, the seller 116 may provide user input representative of specific ticket information for inclusion in the listing. For example, the seller 116 may provide a seat number, a date, participants or performers, and the like. In addition, during or following creation of the listing, the seller 116 may upload a portion of ticket information that may be included on the ticket. The portion of ticket information may be an image of less than the entire ticket, a ticket on a digital wallet (e.g., PASSBOOK® or APPLE WALLET®), an optical, machine readable image (e.g., a barcode) of a ticket, a ticket in a particular format (e.g., mobile only or portable document format (PDF) only), or less than all information included on a ticket (e.g., only a barcode or QR code) or digital representation thereof.

In some circumstances, the seller 116 may have only a particular version (e.g., mobile ticket, physical PDF, etc.) of the ticket with only the portion of ticket information that is included in the ticket. In other circumstances, the secondary server 108 may request the portion of ticket information included on the ticket. The portion of the information requested may be based on an entity type of the seller 116, for instance. The secondary server 108 may be configured to convert the portion of ticket information to an optimized ticket. Following a transaction between the seller 116 and the buyer 117, the optimized ticket may be transferred to the buyer 117.

For example, the seller 116 may have a PDF version of a ticket. A listing for the ticket may include the PDF version of the ticket. However, the buyer 117 may want a mobile ticket, which may eliminate a need for the buyer 117 to print out a PDF of the ticket prior to the event. Accordingly, to communicate a mobile ticket to the buyer 117, the secondary server 108 may convert the PDF version of the ticket to a mobile ticket format.

As described below, the secondary server 108 may perform multiple types of conversions based on the information that is included in the portion of ticket information from the seller 116. The portion of ticket information may include, for example, a screenshot of a mobile ticket, an image of the ticket, a PDF of a ticket, a barcode (or QR code) included on a ticket, and a mobile ticket in another format.

The operating environment 100 of FIG. 1 includes the primary server 106, a first computing device 102, the buyer device 104, a venue server 112, a venue 118, the seller 116 and the buyer 117, and the secondary server 108. The primary server 106, the first computing device 102, the buyer devices 104, the venue server 112, the venue 118, and the secondary server 108 are collectively referred to as environment components. In the operating environment 100, the environment components communicate data and information using a communication network (network) 122. For example, the portion of ticket information may be communicated via the network 122 and the transaction between the buyer 117 and the seller 116 using the secondary server 108 may occur at least partially by communicating data and information via the network 122. Each of the environment components and the network 122 are briefly described in the following paragraphs.

The network 122 may include a wired network, a wireless network, or any combination thereof. The network 122 may include any suitable configuration or configurations including a star configuration, token ring configuration, or other configurations. The network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different communication protocols. In some embodiments, the network 122 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, and the like.

The buyer 117 and the seller 116 may include individuals or entities that may interface with the buyer device 104 or the first computing device 102, respectively, to participate in a ticket transaction via the secondary server 108. Participation in the ticket transaction may include, for example, an offer or listing of a ticket for sale, searching for a ticket to an upcoming event, purchase of a ticket, or some combination thereof. Participation in a ticket transaction may involve the buyer 117 and/or the seller 116 providing user input to the buyer device 104 or the first computing device 102, respectively, which may be communicated to the secondary server 108. In FIG. 1, the buyer 117 is separate from the seller 116. However, the distinction between the buyer 117 and the seller 116 only designates a role in a particular transaction. The buyer 117 may be a seller 116 in a previous or subsequent transaction and vice versa.

The seller 116 may be characterized by an entity type. The entity type may indicate a number of transactions in which the seller 116 executes in the operating environment 100 and/or a level of trust between the seller 116 and the secondary server 108. An example of the entity type may include a consumer seller. The consumer seller may be a seller who executes transactions infrequently (e.g., once a month or once a quarter) and executes transactions that involve a few (e.g., 2, 4, or 6) tickets. Generally, the consumer seller is not regularly engaged in the business of selling tickets. An example consumer seller likely purchased the tickets for their use and decided to sell the tickets due to an inability to attend an event. The consumer seller may not be considered a trusted entity by the secondary server 108.

Another example of the entity type may be a sophisticated seller. The sophisticated seller may be a seller who executes transactions frequently (e.g., multiple transactions per day) and executes transactions that involve large numbers (e.g., 20, 40, or 60) tickets. The sophisticated seller may be engaged in the business of selling tickets. An example of the sophisticated seller is a ticket broker. The sophisticated seller may be considered a trusted entity by the secondary server 108.

The buyer device 104 and the first computing device 102 may include a computing system that may include a processor, memory, and network communication capabilities. The buyer device 104 and the first computing device 102 may be configured for communication with one or more other environment components via the network 122. Some examples of the buyer device 104 and the first computing device 102 include a laptop computer, a desktop computer, a tablet computer, a smartphone, a personal digital assistant ("PDA"), a mobile e-mail device, a portable game player, smart wearable technology, or any other applicable electronic device capable of accessing the network 122.

In FIG. 1, the buyer 117 is associated with the buyer device 104. It may be appreciated with the benefit of this disclosure, that buyer device 104 is not fixed and the buyer 117 may be associated with multiple buyer devices 104. For example, the buyer 117 may interface with a mobile device (e.g., a smartphone) and receive and view a mobile ticket on the mobile device. The buyer 117 may also interface with the secondary server 108 via a desktop computer. During the interface using the desktop computer, the buyer 117 may access a PDF ticket (or another printable version of a ticket).

In some embodiments a native application 313 may be loaded on the first computing device 102 and/or the buyer device 104. The native application 313 may be configured to facilitate interactions with the secondary server 108. In these embodiments, the secondary server 108 may cause display of information and data on a display of the first computing device 102 and/or the buyer device 104 via the native application 313. Some additional details of the native application 313 are provided below. In some embodiments, the first computing device 102 and/or the buyer device 104 may interface with the secondary server 108 via a web browser.

The venue 118 may include any forum in which events take place or are performed. Some examples of the venue 118 may include a stadium, an arena, a theatre, a parking lot, a fairground, and the like. The event may include any type of happening in which tickets are used for entry. Some examples of the event are sporting events, concerts, plays, movies, festivals, parking for other events, and the like. The venue 118 may be associated with the venue server 112.

The venue server 112 may include a hardware server that includes a processor, memory, and network communication capabilities. In the illustrated implementation, the venue server 112 is configured to communicate via the network 122 with the other environment components. The venue server 112 may track and generate event information that pertains to one or more events at the venue 118. For example, the event information may include ticket information (e.g., time, date, participants, and the like) for an upcoming event.

The ticket information may be communicated to or accessed by the secondary server 108. In addition, one or more portions of the event information may be updated as tickets are sold or circumstances change for an event. Updated ticket information may be communicated to or accessed by the secondary server 108.

The primary marketplace 113 may include any entity that transfers tickets to events at the venue 118 to the seller 116. The primary marketplace 113 in some embodiments is affiliated with the venue 118 and sells the tickets directly from the venue 118 to the seller 116. In other embodiments, the primary marketplace 113 may include another secondary ticket marketplace that is similar to the secondary ticket marketplace associated with the secondary server 108.

The primary server 106 may include a hardware server that includes a processor, memory, and network communication capabilities. The primary server 106 may be associated with the primary marketplace 113. The primary server 106 may be configured for sales of tickets to events at the venue 118. For example, the seller 116 may purchase a ticket from a primary server 106 or application hosted thereon.

In some embodiments, the secondary server 108 may be a partner of the primary marketplace 113. In these embodiments, the secondary server 108 may communicate data and information with the primary server 106. For instance, the secondary server 108 may access additional ticket information from the primary server 106 in circumstances in which the seller 116 provides the portion of ticket information.

The secondary server 108 may include a hardware server that includes a processor, memory, and network communication capabilities. In the illustrated implementation, the secondary server 108 is configured to communicate via the network 122 with the other environment components.

The secondary server 108 may include a conversion module 120. The conversion module 120 may be configured to implement a conversion process prior to, during, or subsequent to an online transfer of a ticket between the seller 116 and the buyer 117 that is performed in the operating environment 100.

For example, in some embodiments, the conversion module 120 may request the portion of ticket information relating to a ticket for sale. The portion of ticket information requested by the conversion module 120 may be based on the entity type of the seller 116. The conversion module 120 may receive the portion of ticket information. The portion of ticket information may be received from the first computing device 102 associated with the seller 116. The conversion module 120 receives user input that is used to indicate transfer of the ticket. The user input may be received from the buyer device 104 associated with the buyer 117. In response to additional user input from the buyer device 104 used to access the ticket following transfer of the ticket, the conversion module 120 may access additional ticket information related to the ticket and to an event for which the ticket is issued. Based on the information included in the portion of ticket information, the conversion module 120 may convert the portion of ticket information to an optimized ticket.

The conversion module 120 and/or the native application 313 may be implemented using hardware including a processor, a microprocessor (e.g., to perform or control performance of one or more operations), a field-programmable gate array (FPGA), or an application-specific integrated circuit (ASIC). In some other instances, the conversion module 120 and/or the native application 313 may be implemented using a combination of hardware and software. Implementation in software may include rapid activation and deactivation of one or more transistors or transistor elements such as may be included in hardware of a computing system (e.g., the secondary server 108, the buyer device 104, or the first computing device 102). Additionally, software defined instructions may operate on information within transistor elements. Implementation of software instructions may at least temporarily reconfigure electronic pathways and transform computing hardware.

In the operating environment 100, memory in one or more of the environment components may be similar to memory 508 described with reference to FIG. 5, processors in one or more of the environment components may be similar to a processor 504 described with reference to FIG. 5, and network communication capabilities of one or more of the environment components may be provided by a communication unit 502 described with reference to FIG. 5.

Modifications, additions, or omissions may be made to the operating environment 100 without departing from the scope of the present disclosure. Specifically, embodiments may include one or more buyer devices 104, one or more first computing devices 102, one or more buyers 117, one or more sellers 116, one or more venue servers 112, one or more venues 118, one or more secondary servers 108, one or more primary servers 106, or some combination thereof.

Moreover, the separation of various components in the embodiments described herein is not meant to indicate that the separation occurs in all embodiments. It may be understood with the benefit of this disclosure that the described components may be integrated together in a single component or separated into multiple components. For example, in some embodiments the primary server 106 may be integrated in the venue server 112.

Figure 2:
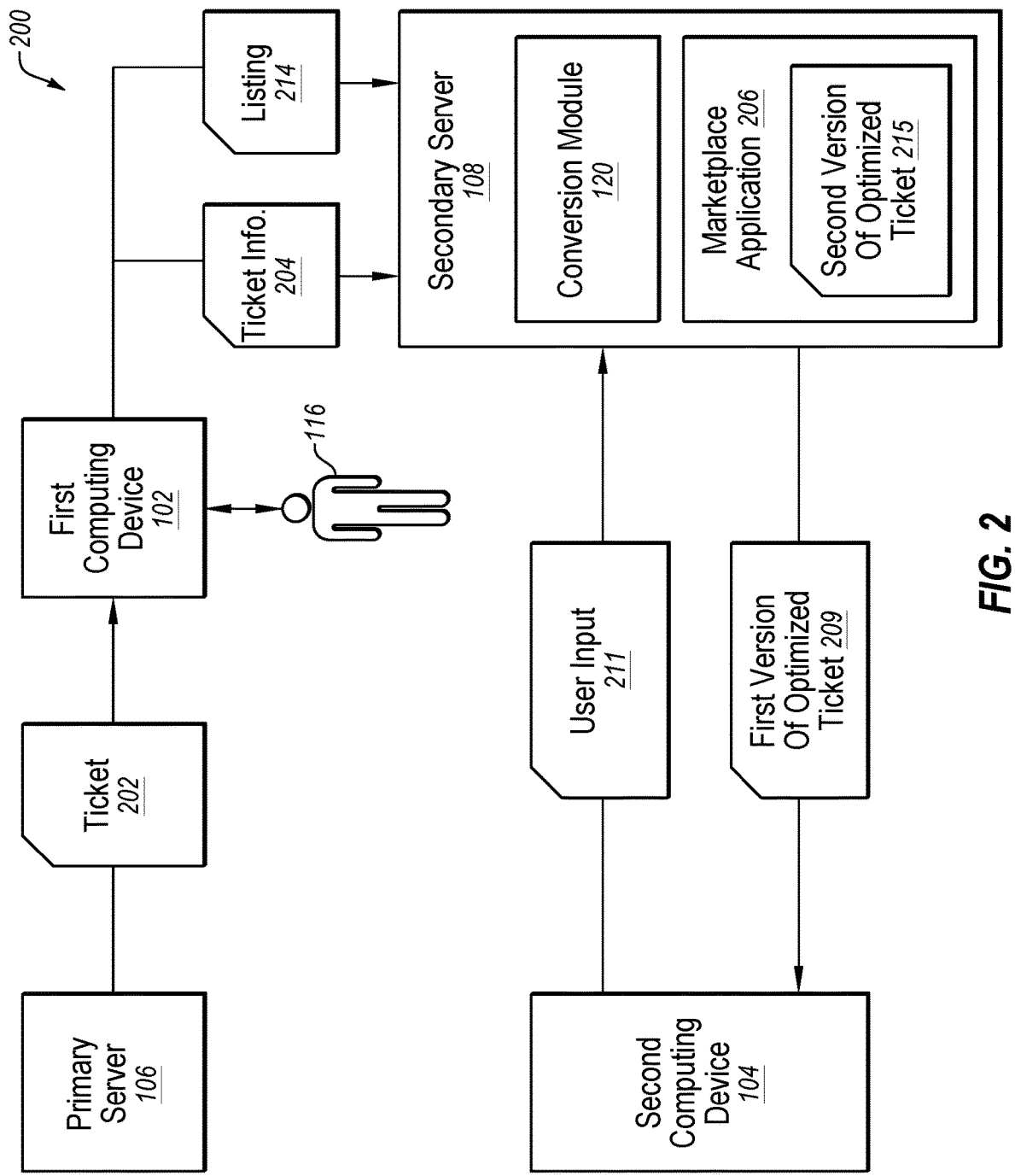
FIG. 2 illustrates an example of a conversion process that may be implemented in the operating environment of FIG. 1.

FIG. 2 illustrates an example of a conversion process 200 that may be implemented in a marketplace environment such as the operating environment 100 of FIG. 1. The conversion process 200 of FIG. 2 includes multiple environment components (e.g., 106, 102, 108, and 104) described with reference to FIG. 1.

In the conversion process 200 of FIG. 2, a ticket 202 is purchased by a seller 116. The seller 116 may, for example, use the first computing device 102 to access the primary server 106 and purchase the ticket 202 using an online application. Alternatively, the seller 116 may enter a physical marketplace and purchase the ticket 202 (e.g., at SMITH'S TIX or the venue 118 of FIG. 1). Either included in the transaction for the ticket 202 or through some action by the seller 116, a digital representation of the ticket 202 is stored on the first computing device 102. For example, the seller 116 may photograph a portion of the ticket 202, take a screenshot of a mobile version of the ticket 202, photograph a PDF version of the ticket 202, access a scanned copy of the ticket 202, access a digital copy of the ticket 202 in an email account or SMS message, etc.

The seller 116 may create a listing 214 for the ticket 202 using the first computing device 102. The listing 214 may include information used to post the ticket 202 for sale on a marketplace application 206 hosted by the secondary server 108. The listing 214 includes a specification of information pertaining to the ticket 202 and/or the event for which the ticket 202 is issued by the primary server 106. For instance, the listing 214 may include the event (e.g., time, venue, location, date, participant, seat location, etc.). Along with the listing 214, a portion of ticket information 204 (in FIG. 2 "ticket info. 204") may be communicated to the secondary server 108 from the first computing device 102.

The portion of ticket information 204 may be requested by the secondary server 108. In some embodiments, the portion of ticket information requested by the secondary server 108 may be based on the entity type of the seller 116. For example, in a mobile ticket scenario, the seller 116 may have the mobile ticket, which may not be able to be converted to a PDF. Accordingly, the mobile ticket may not be able to be uploaded to the secondary server 108. For instance, the secondary server 108 may reject the mobile ticket because a converted PDF may omit some text normally included in a genuine PDF ticket. Thus, the secondary server 108 may request the seller 116 to provide a screenshot image of the mobile ticket. The screenshot image may not be treated as a PDF ticket. Instead, the screenshot image may be scanned to access additional ticket information used in generation of an optimized ticket. Scanning the screenshot image may be resource and time intensive. If the seller 116 is a consumer seller, the scanning of the screenshot may delay processing, but such delay may be short because the consumer seller is only selling a small number (e.g., 1, 2, or 4) of tickets. Additionally, the consumer seller may not be trusted by the secondary server 108. Accordingly, the secondary server 108 may prefer to verify all information in the scanned image to ensure accuracy and legitimacy of the ticket.

If, however, the seller is a sophisticated seller such as a ticket broker, the resource and time involved in the scanning of a large number of tickets (e.g., 10, 20, etc.) may deter use of the secondary server 108. Moreover, the sophisticated seller may be trusted by the secondary server 108. Consequently, instead of scanning the entire screenshot image of each ticket, the secondary server 108 may request entry of barcode information instead of entry of the screenshot images.

The portion of ticket information 204 may be received at the secondary server 108. The portion of ticket information may relate to the ticket 202. The portion of ticket information 204 may include, for example, a screenshot of a mobile version of the ticket 202, an image of the ticket 202, a PDF of the ticket 202, a barcode or QR code included on the ticket 202, and a mobile version of the ticket 202 in a particular, non-transferable format.

The secondary server 108 may verify the portion of ticket information 204. For instance, the secondary server 108 may verify the portion of ticket information 204 correctly relates to the event for which the ticket 202 is issued. For example, the portion of ticket information 204 may refer to an event that occurs at an incorrect venue. Verification of the portion of ticket information 204 may reduce such errors.

Additionally or alternatively, the secondary server 108 may verify the portion of ticket information 204 such that the portion of ticket information 204 does not reference a ticket included in a previous listing. For instance, the secondary server 108 may verify that the portion of ticket information 204 is not for an event that has already occurred and/or that the same ticket has not been listed multiple times. Verification may reduce fraud and errors.

For instance, a seller 116 may attempt to sell the same ticket multiple times or may have obtained the portion of ticket information 204 without purchasing the ticket 202 from the primary server 106. The seller 116 may attempt to sell a fake ticket or fraudulently transfer a ticket to a buyer (e.g., the buyer 117 of FIG. 1). Accordingly, to reduce or prevent fraud by the seller 116, the secondary server 108 may verify the portion of ticket information 204 prior to posting the listing 214. Additionally, because the portion of ticket information 204 is less than the entire ticket, the portion of ticket information 204 may introduce errors in the listing 214. Accordingly, to reduce or prevent mistakes in the listing 214, the secondary server 108 may verify the portion of ticket information 204 prior to posting the listing 214.

User input 211 may be received from the buyer device 104 at the secondary server 108. The user input 211 may be used to indicate purchase of the ticket 202 on the marketplace application 206. Additionally, the user input 211 may be used to access the ticket 202 following purchase of the ticket 202. The conversion module 120 of the secondary server 108 may access additional ticket information. In some embodiments, the secondary server 108 may access additional ticket information in response to the user input 211 used to access the ticket 202 following purchase of the ticket 202. The conversion module 120 may access the additional ticket information from a venue server (e.g., the venue server 112 in FIG. 1), the primary server 106, another source, or some combination thereof. The additional ticket information may be related to the ticket 202 and an event for which the ticket 202 is issued.

The conversion module 120 may convert the portion of ticket information 204 to an optimized ticket. The portion of ticket information 204 may be converted to the optimized ticket based on the information included in the portion of ticket information 204 and the additional ticket information accessed by the conversion module 120.

In some embodiments, conversion may be performed on the fly. For instance the conversion may be performed in response to the user input 211 used to access the ticket 202 following purchase of the ticket 202.

A first version of the optimized ticket 209 may be caused to be displayed on the buyer device 104. For example, the conversion module 120 may cause the first version of the optimized ticket 209 to be displayed on the buyer device 104 in response to the user input 211 used to access the ticket 202.

In addition, the conversion module 120 may enable access to a second version of the optimized ticket 215. For example, the conversion module 120 may enable access to the second version of the optimized ticket 215 via the marketplace application 206 hosted by the secondary server 108.

As discussed above, the conversion process 200 of FIG. 2 may be based on information included in the portion of ticket information 204. FIGS. 3A-3E depict example conversion processes 300A-300E that may be implemented based on information included in the portion of ticket information 204. FIGS. 4A-4E depict example sequence charts 400A-400E for each of the conversion processes 300A-300E. Each of the conversion processes 300A-300E and the sequence charts 400A-400E are described in the following paragraphs.

Figure 3A:
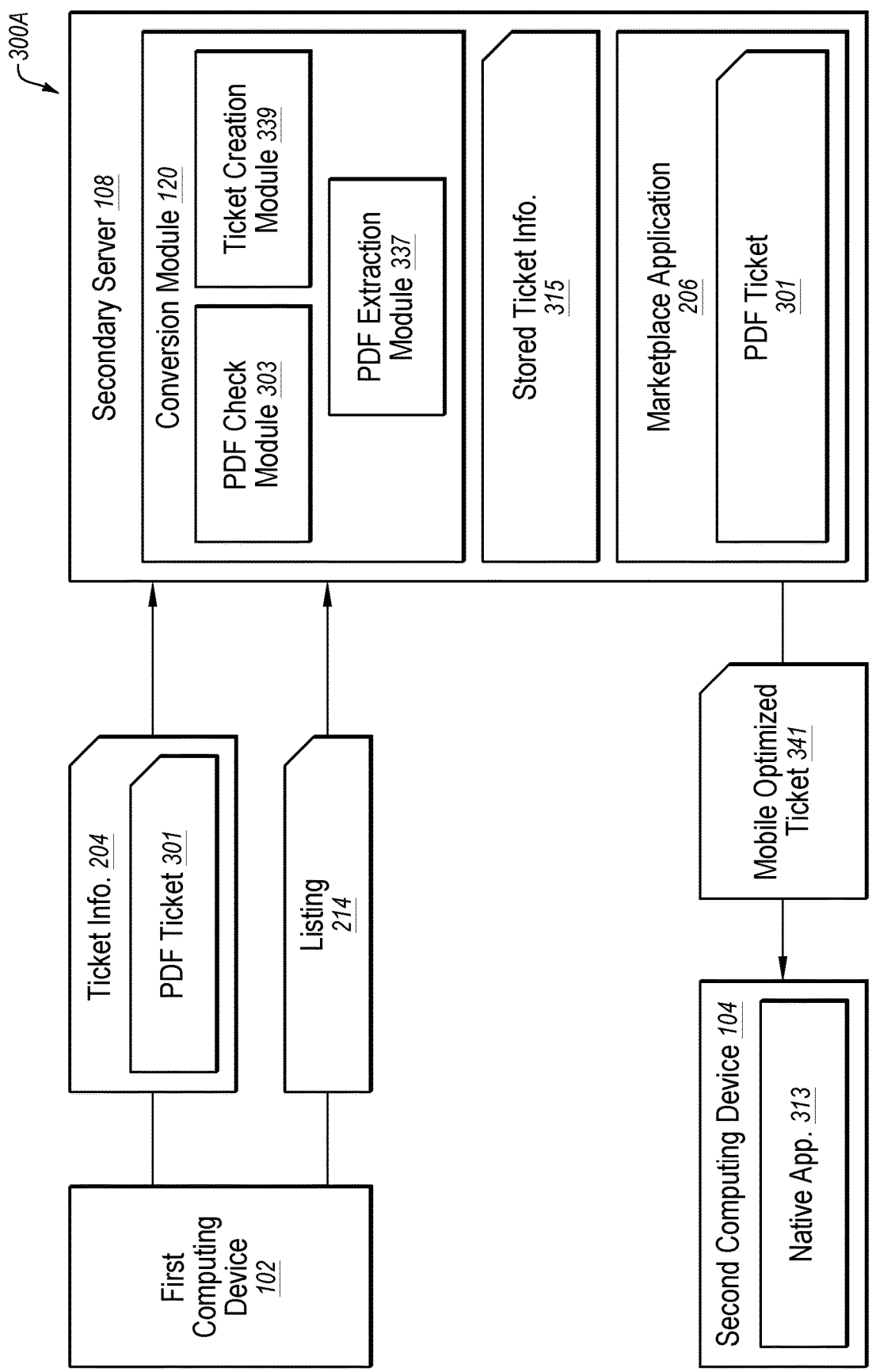
FIG. 3A illustrates an example conversion process that may be implemented in the operating environment of FIG. 1.

FIG. 3A illustrates an example conversion process 300A that may be implemented in circumstances in which the portion of ticket information (in FIGS. 3A-3E, "ticket info. 204") 204 includes a PDF ticket 301. FIG. 4A illustrates an example sequence chart 400A that represents an example sequence of operations that may be implemented in the conversion process 300A. The sequence chart 400A of FIG. 4A includes environmental components (e.g., the first computing device 102, the conversion module 120, the buyer device 104, and the native application 313 ("native app." in FIG. 4A) that may perform one or more operations (e.g., 402, 404, 406, 408, 410, 412, 414, and 416) positioned to the right of the environmental components.

In the conversion process 300A of FIG. 3A and the sequence chart 400A of FIG. 4A, the first computing device 102 may be configured to create a listing 214. The listing 214 may be for a ticket offered for sale. Either during creation of the listing 214 or subsequent to the creation of the listing 214, the first computing device 102 may communicate or upload the portion of ticket information 204, which includes the PDF ticket 301 (operation 402 in FIG. 4A). The secondary server 108 may receive the portion of ticket information 204.

The conversion module 120 may include a PDF check module 303. The PDF check module 303 may be configured to verify the portion of ticket information 204 (operation 404 of FIG. 4A). For example, the PDF check module 303 may verify that the portion of ticket information 204 correctly relates to the event for which the ticket is issued and/or does not reference a ticket included in a previous listing. In response to the portion of ticket information 204 relating to another event or a previous listing, the conversion module 120 may communicate a message to the first computing device 102 indicating a problem with the verification. A seller may correct the problem in the listing 214.

The conversion module 120 may include a PDF extraction module 337. In response to the portion of ticket information 204 including the PDF ticket 301, the secondary server 108 may determine whether the primary marketplace is a partner of the secondary ticket marketplace. In response to the primary marketplace not being a partner, the PDF extraction module 337 may parse the PDF ticket 301 and extract information from the PDF ticket 301 (operation 406 of FIG. 4A). In addition, the PDF extraction module 337 may access stored ticket information 315, which may include mobile flags, barcode formats, team assets, venue assets, and the like. In some embodiments, the secondary server 108 may store and update the stored ticket information 315 for one or more venues, teams, primary marketplaces, etc.

The conversion module 120 may include a ticket creation module 339. The ticket creation module 339 may create a copy of the PDF ticket 301 which may be stored on the marketplace application 206. The ticket creation module 339 may be further configured to generate a mobile optimized ticket 341. The mobile optimized ticket 341 may be based on the stored ticket information 315 and/or the ticket information extracted from the PDF ticket 301. Extracted ticket information and/or the stored ticket information 315 may be related to the ticket and the event for which the ticket is issued and/or on the information included in the portion of ticket information 204. The mobile optimized ticket 341 and the PDF ticket 301 may be an example of the optimized ticket or versions thereof.

Following purchase of the listing (operation 408 of FIG. 4A) the buyer device 104 may be able to access the PDF ticket 301 (operation 410 in FIG. 4A) on the marketplace application 206. Additionally, following the purchase of the listing, the buyer device 104 may have access to the mobile optimized ticket 341 on the native application 313 (operation 412 of FIG. 4A).

The native application 313 may be configured to access additional information (operation 414 of FIG. 4A), which may be similar to the stored ticket information 315. For instance, the additional information may include order details with a barcode number and ticket format in some embodiments. The additional information may be used by the native application 313 to create and display the mobile optimized ticket 341 (operation 416 of FIG. 4A). Additionally or alternatively, the conversion module 120 may be configured to cause a display of the mobile optimized ticket 341 on the buyer device 104.

Figure 3B:
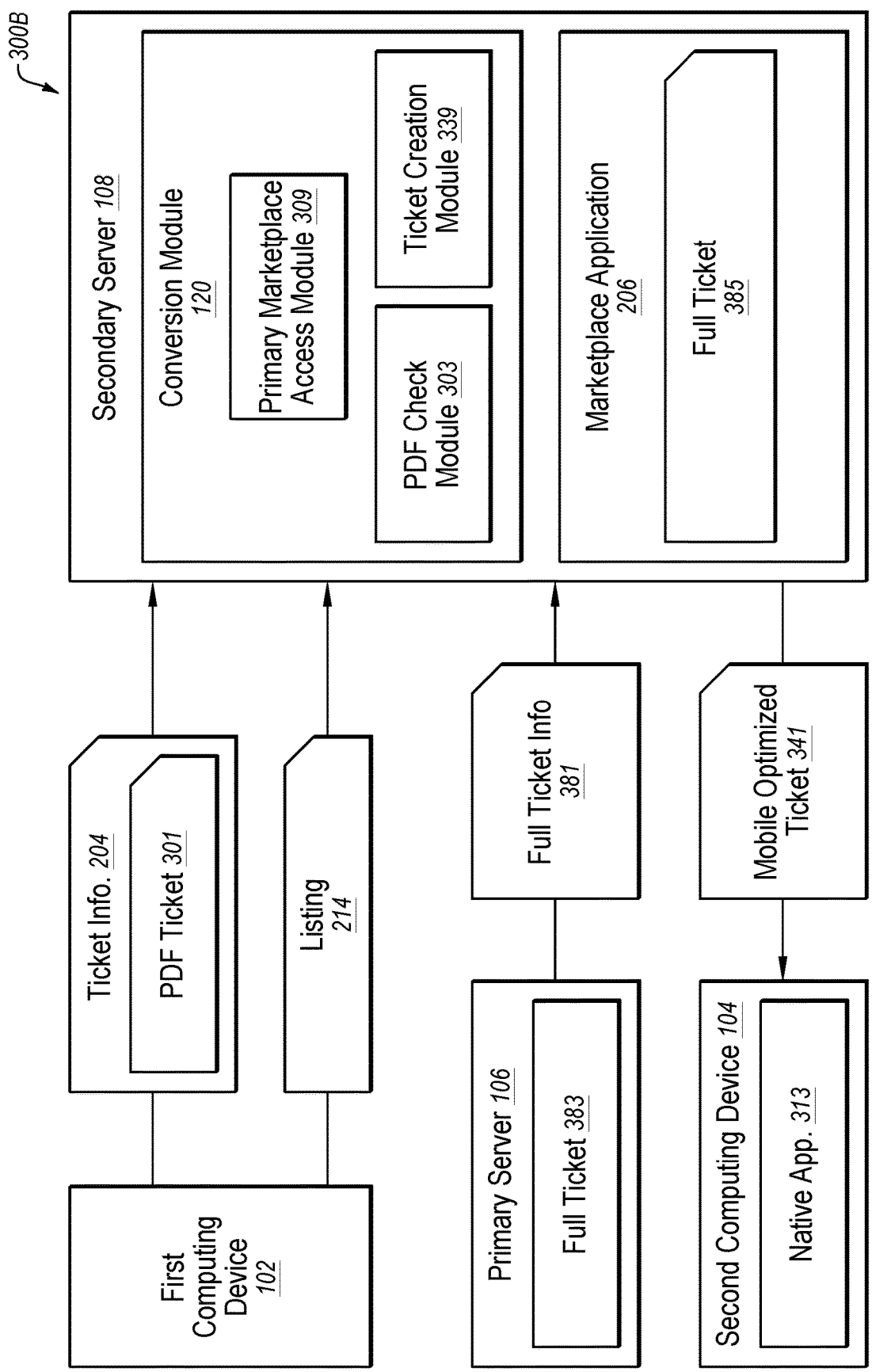
FIG. 3B illustrates another example conversion process that may be implemented in the operating environment of FIG. 1.
Figure 4A:
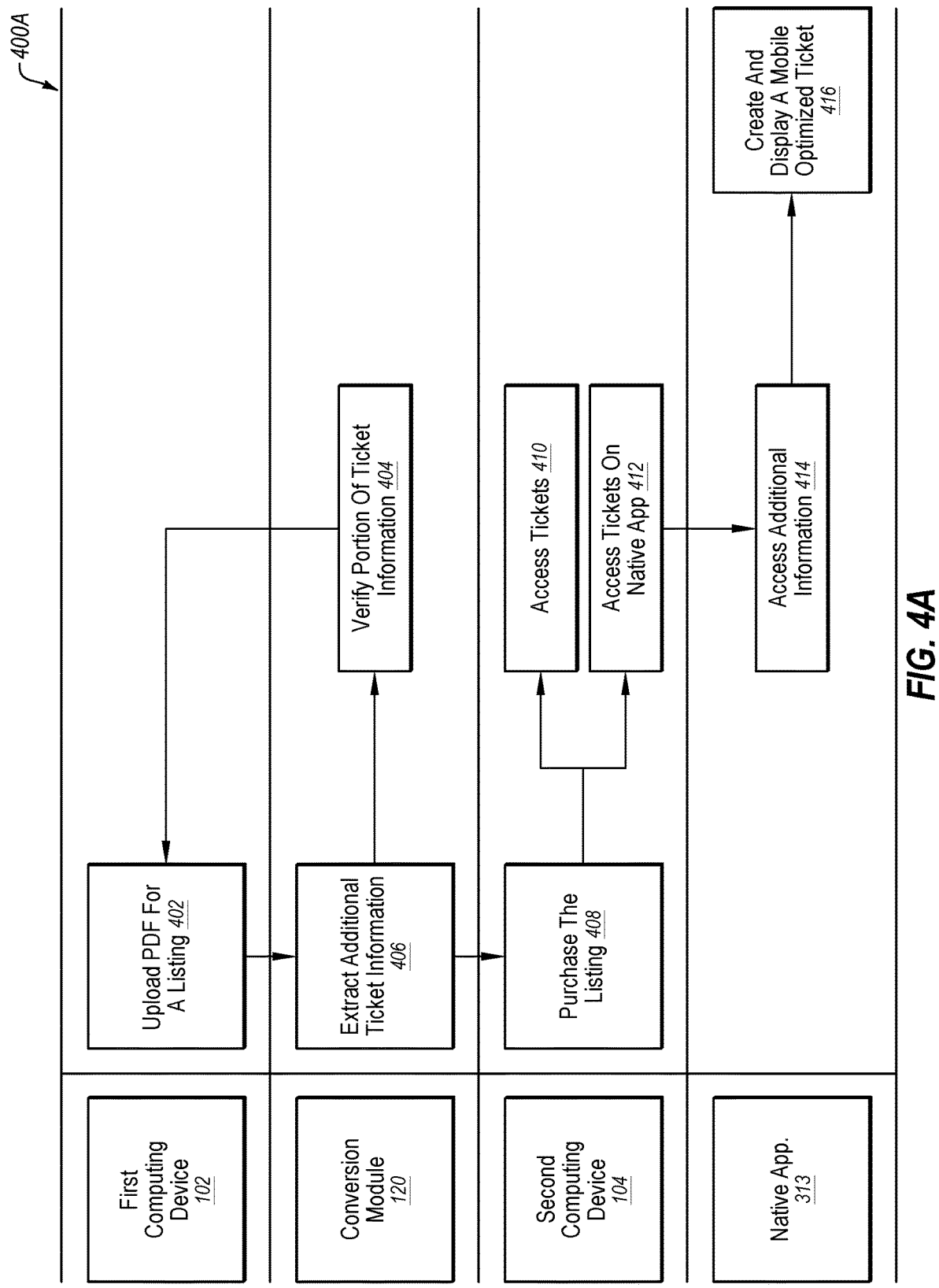
FIG. 4A illustrates an example sequence chart that represents an example sequence of operations that may be implemented in the conversion process of FIG. 3A.
Figure 4B:
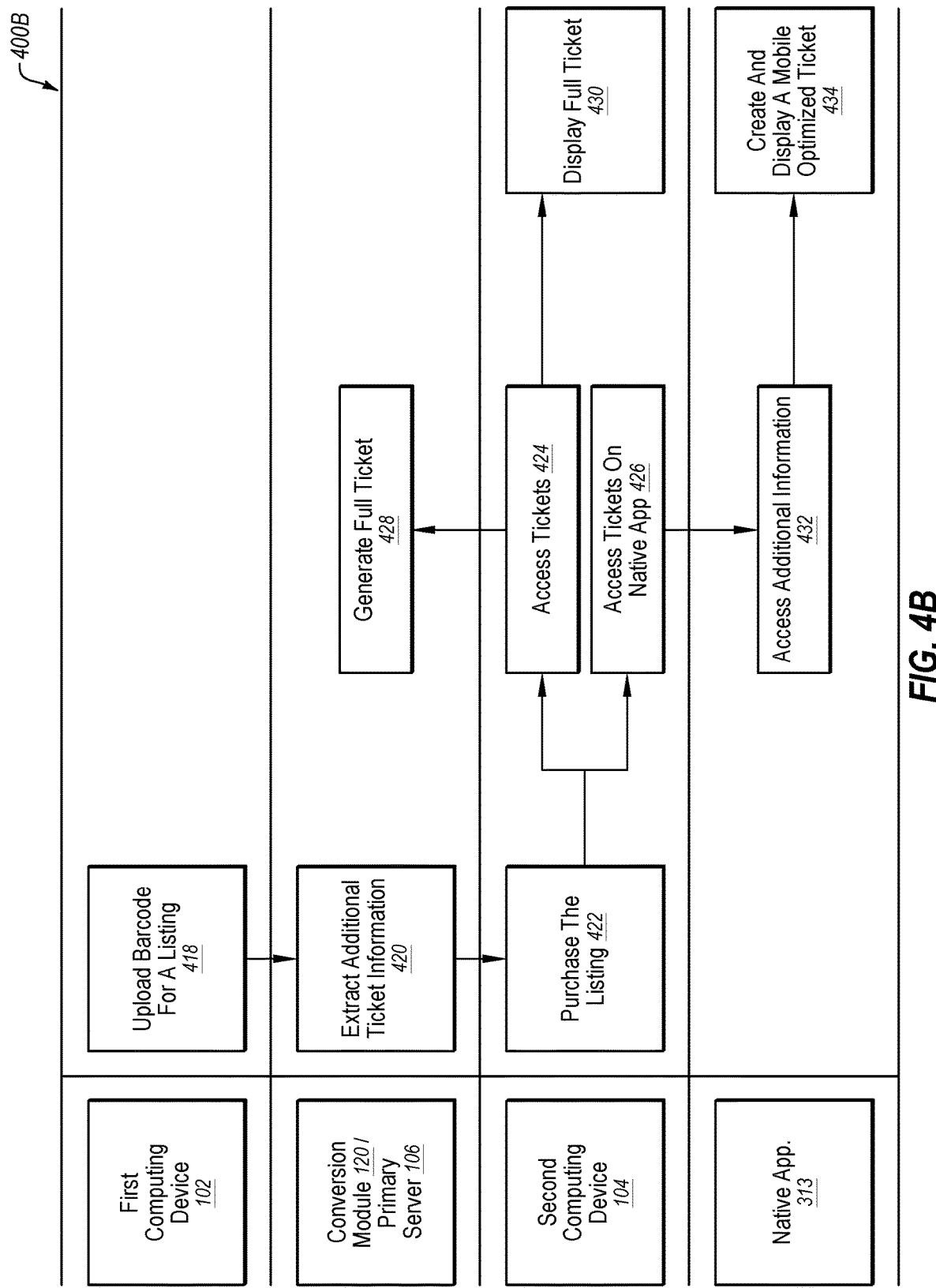
FIG. 4B illustrates an example sequence chart that represents an example sequence of operations that may be implemented in the conversion process of FIG. 3B.

FIG. 3B illustrates another example conversion process 300B that may be implemented in circumstances in which the portion of ticket information 204 includes a PDF ticket 301. FIG. 4B illustrates an example sequence chart 400B that represents an example sequence of operations that may be implemented in the conversion process 300B. The sequence chart 400B of FIG. 4B includes environmental components (e.g., the first computing device 102, the primary server 106, the conversion module 120, the buyer device 104, and the native application 313 ("native app." in FIG. 4B)) that may perform one or more operations (e.g., 418, 420, 422, 428, 424, 426, 428, 430, 432, and 434) positioned to the right of the environmental components.

In the conversion process 300B of FIG. 3B and the sequence chart 400B, the first computing device 102 may be configured to create a listing 214. The listing 214 may be for a ticket offered for sale. Either during creation of the listing 214 or subsequent to the creation of the listing 214, the first computing device 102 may communicate or upload the portion of ticket information 204, which includes the PDF ticket 301 (operation 418 in FIG. 4B). The secondary server 108 may receive the portion of ticket information 204.

The conversion module 120 may include a PDF check module 303, which may verify the portion of the ticket information as described above. The conversion module 120 may include a primary marketplace access module 309. In response to the portion of ticket information 204 including the PDF ticket 301, the secondary server 108 may determine whether the primary marketplace is a partner of the secondary ticket marketplace. In response to the primary marketplace being a partner, the primary marketplace access module 309 may access the primary server 106. The partnership may relate to an agreement between the primary marketplace and the secondary ticket marketplace. For instance, TICKETMASTER® or THE STAPLES CENTER® may have an agreement with STUBHUB® to share ticket information.

The primary server 106 may have a full ticket 383. The full ticket 383 may include the entire, originally issued ticket and information included therein. Full ticket information 381 related to the full ticket 383 may be accessed by the primary marketplace access module 309 (operation 420 in FIG. 4B).

Based on the full ticket information 381, the ticket creation module 339 may generate a copy of the full ticket 383, which is represented by full ticket 385 (operation 428 in FIG. 4B). The conversion module 120 may make the full ticket 385 available such that the buyer device 104 can access the full ticket 385 following purchase of the listing (operation 424 in FIG. 4B). Additionally, the conversion module 120 may make the full ticket 383 on the primary server 106 available following purchase of the listing (operation 424 in FIG. 4B). The secondary server 108 may cause display of the full ticket 385 on the buyer device 104 (operation 430 of FIG. 4B).

In some embodiments, the primary server 106 may be integrated with the secondary server 108 or at least some portion of the conversion module 120. In these and other embodiments, the primary marketplace access module 309 may be configured to access information stored on an integrated portion of the primary server 106 that pertains to the ticket.

The conversion module 120 may include a ticket creation module 339. The ticket creation module 339 may be configured to generate a mobile optimized ticket 341. The mobile optimized ticket 341 may be based on the full ticket information 381 accessed from the primary server 106, which may be related to the ticket and the event for which the ticket is issued and/or on the information included in the portion of ticket information 204. The mobile optimized ticket 341 and the full ticket 385 may be an example of the optimized ticket or versions thereof.

Following purchase of the listing (operation 422 of FIG. 4B) the buyer device 104 may be able to access the full ticket 385 on the marketplace application 206 and the full ticket 383 on the primary server 106 (operation 424 of FIG. 4B). Additionally, following the purchase of the listing, the buyer device 104 may have access to the mobile optimized ticket 341 on the native application 313 (operation 426 of FIG. 4B).

The native application 313 may be configured to access additional information (operation 432 of FIG. 4B). The additional information may include order details with a barcode number and ticket format in some embodiments. The additional information may be implemented such as the native application 313 may create and display the mobile optimized ticket 341 (operation 434 of FIG. 4B). Additionally or alternatively, the conversion module 120 may be configured to cause display of the mobile optimized ticket 341 on the buyer device 104.

Figure 3C:
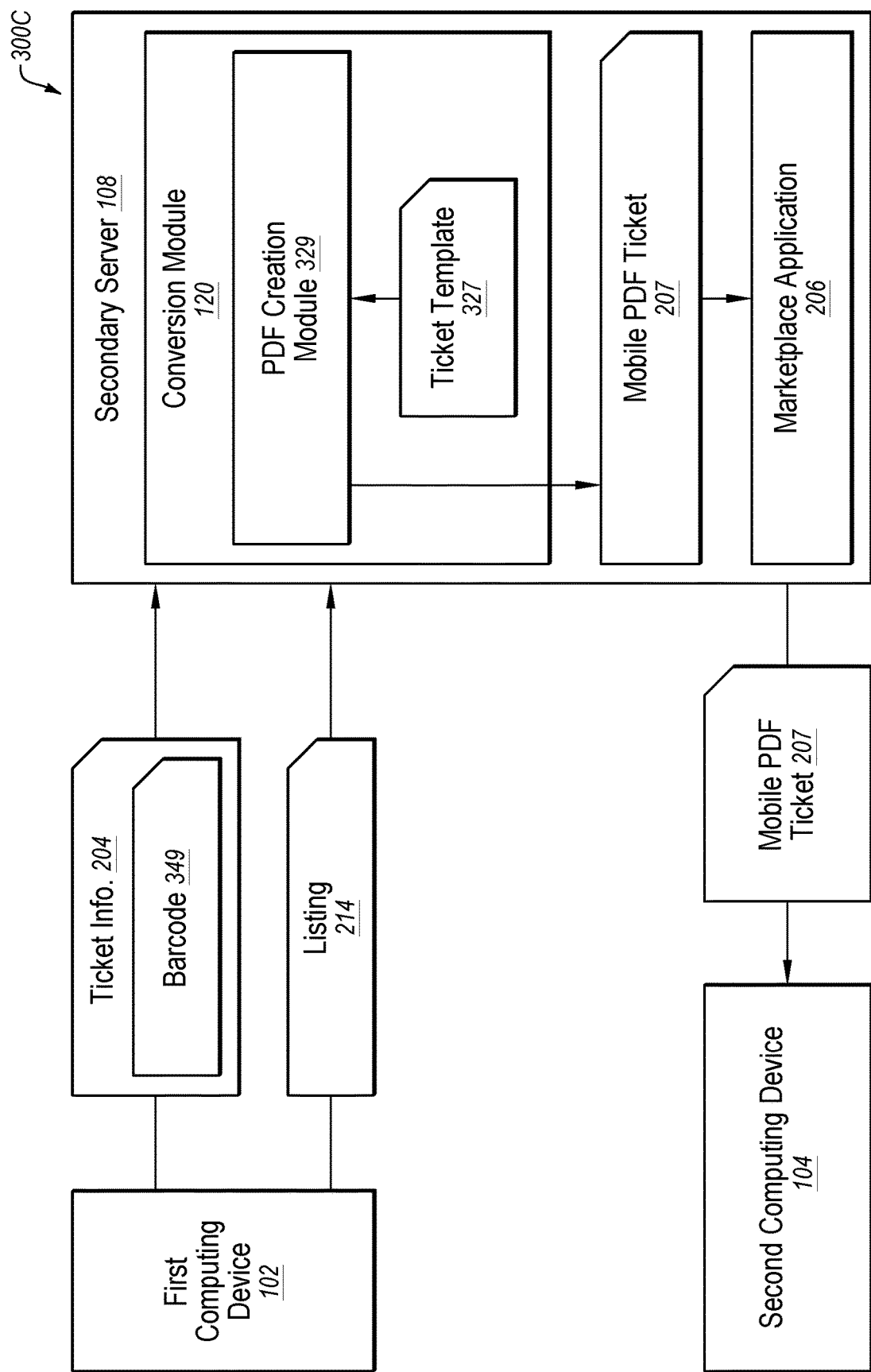
FIG. 3C illustrates another example conversion process that may be implemented in the operating environment of FIG. 1.
Figure 4C:
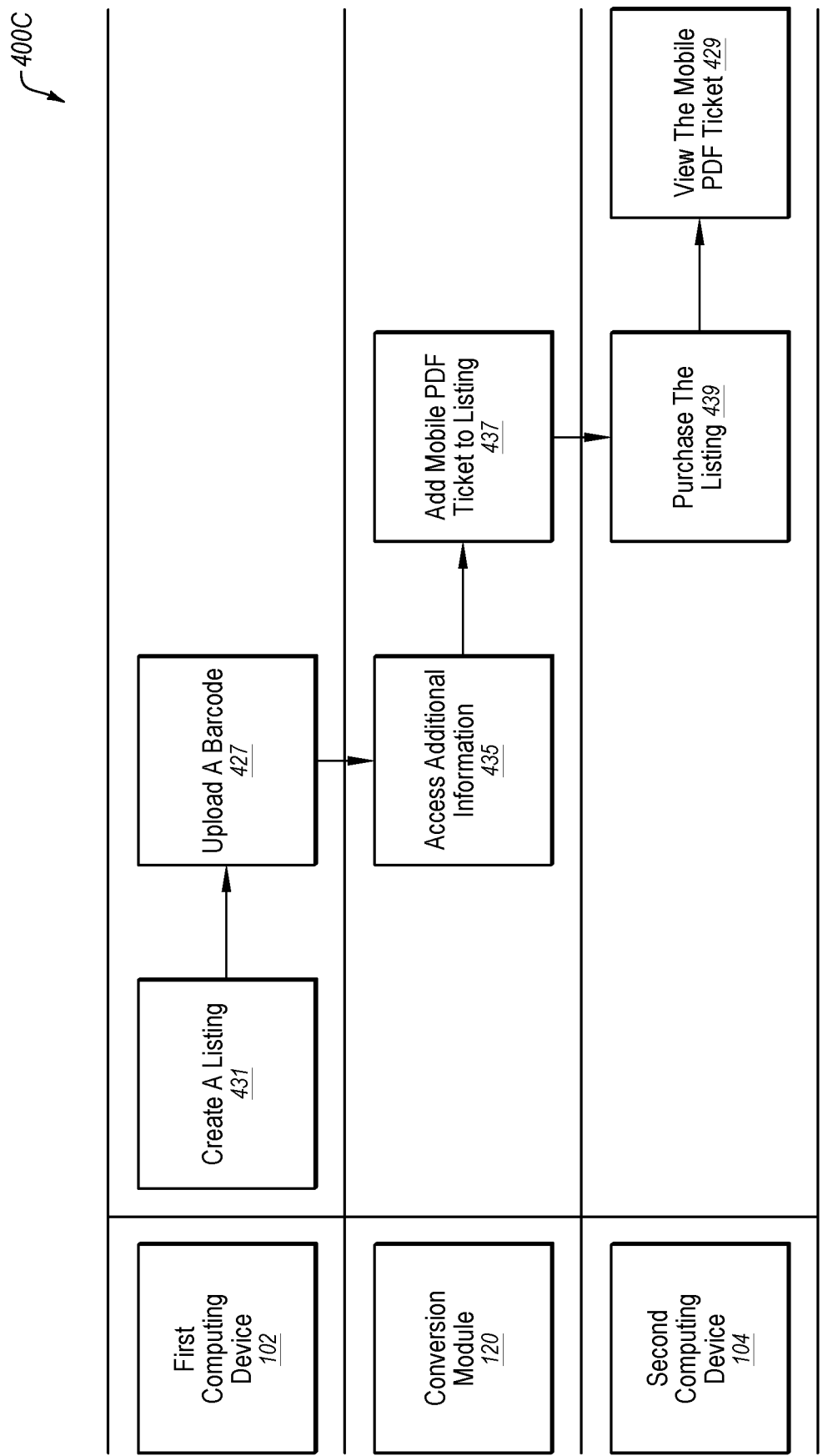
FIG. 4C illustrates an example sequence chart that represents an example sequence of operations that may be implemented in the conversion process of FIG. 3C.

FIG. 3C illustrates an example conversion process 300C in which the portion of ticket information 204 includes a barcode or another optical, machine readable data image (in FIG. 3C, "barcode 349"). FIG. 4C illustrates an example sequence chart 400C that represents an example sequence of operations that may be implemented in the conversion process 300C. The sequence chart 400C of FIG. 4C includes environmental components (e.g., the first computing device 102, the conversion module 120, and the buyer device 104) that may perform one or more operations (e.g., 431, 427, 435, 437, 439, and 429) positioned to the right of the environmental components.

In the conversion process 300C of FIG. 3C and the sequence chart 400C, the first computing device 102 may be configured to create a listing 214 (operation 431 in FIG. 4C). As above, the listing 214 may be for a ticket offered for sale and the first computing device 102 may communicate or upload the portion of ticket information 204, which includes the barcode 349 (operation 427 in FIG. 4C) during or subsequent to creation of the listing 214. The secondary server 108 may receive the portion of ticket information 204.

In response to the portion of ticket information 204 including barcode 349, the secondary server 108 may generate a mobile PDF ticket 207. The mobile PDF ticket 207 may be based on additional ticket information accessed by the secondary server 108, which may be related to the ticket and the event for which the ticket is issued and/or on the information included in the portion of ticket information 204. The mobile PDF ticket 207 is an example of the optimized ticket.

In some embodiments, the secondary server 108 may include the conversion module 120 that further includes a PDF creation module 329. The PDF creation module 329 may be configured to access additional information (operation 435 in FIG. 4C) that pertains to the ticket. The PDF creation module 329 may be configured to generate the mobile PDF ticket 207. The mobile PDF ticket 207 may be based on accessed additional information, the barcode 349, a ticket template 327, or some combination thereof.

The ticket template 327 may be a generalized template that enables organization of the barcode 349, the extracted additional information, or other information in a form that enables use of the mobile PDF ticket 207 at a venue. For example, the ticket template 327 may list seating information in a particular location with the barcode 349 with particular dimensions that enable scanning of the barcode 349.

The PDF creation module 329 may add the mobile PDF ticket 207 to the listing 214 for the ticket on the marketplace application 206 hosted by the secondary server 108 (operation 437 in FIG. 4C). Accordingly, the buyer device 104 may be configured to access and view the mobile PDF ticket 207 while interfacing with the marketplace application 206.

In addition, the secondary server 108 may communicate the mobile PDF ticket 207 or a version thereof to the buyer device 104. The secondary server 108 may cause display of the mobile PDF ticket 207 or a version thereof on the buyer device 104 (operation 429 in FIG. 4C). For instance, the buyer device 104 may include a smart device that is interfacing with the marketplace application 206. During such interfacing, the secondary server 108 may cause the mobile PDF ticket 207 or a version thereof to display on the buyer device 104.

In some embodiments, generation of the mobile PDF ticket 207 may be in response to receipt at the secondary server 108 of user input that is used to indicate purchase of the ticket by the buyer device 104 (operation 439 in FIG. 4C). In some embodiments, the generation of the mobile PDF ticket 207 may occur in response to additional user input from the second computing device used to access the ticket following purchase of the ticket.

Figure 3D:
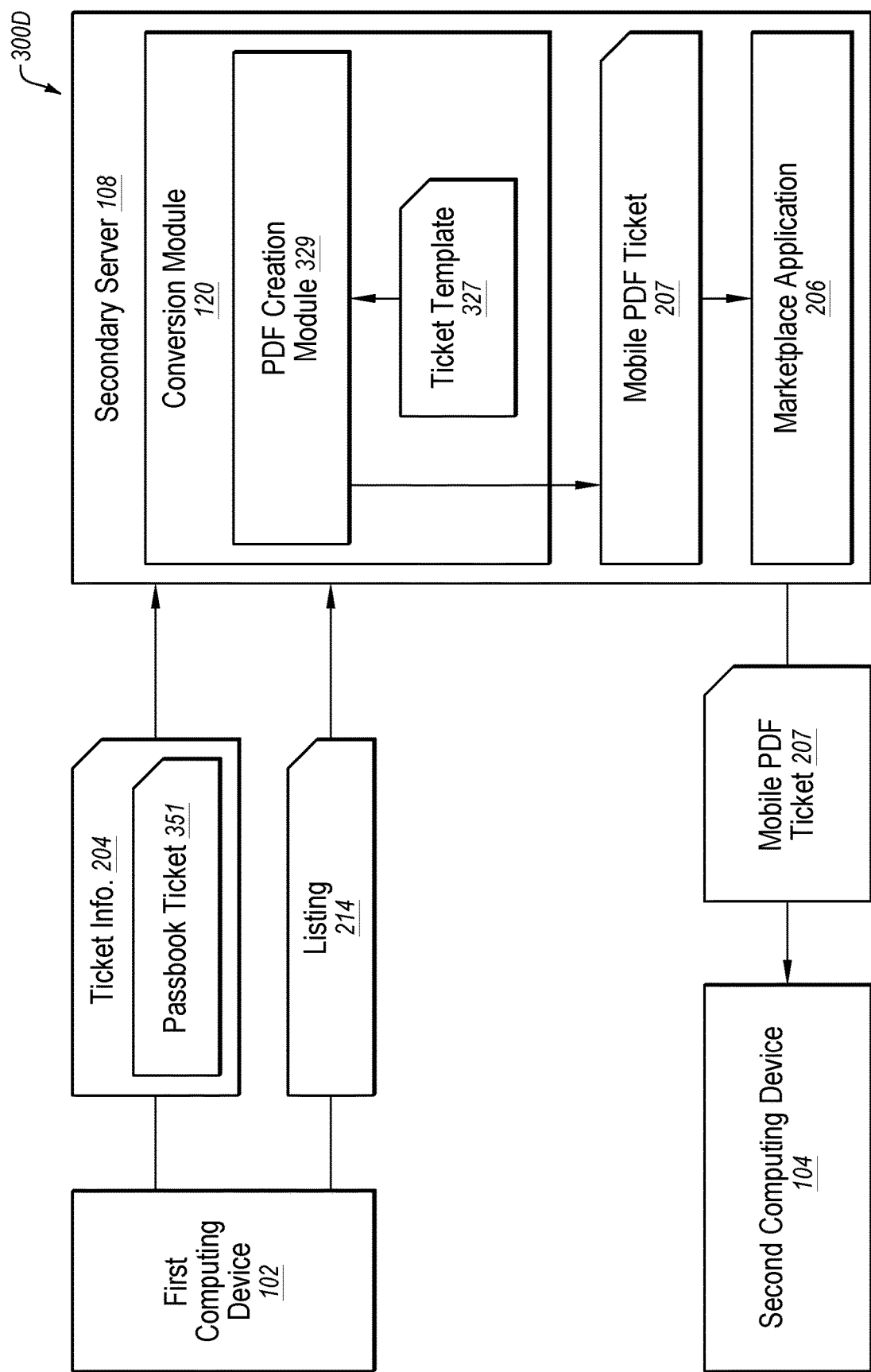
FIG. 3D illustrates another example conversion process that may be implemented in the operating environment of FIG. 1.
Figure 4D:
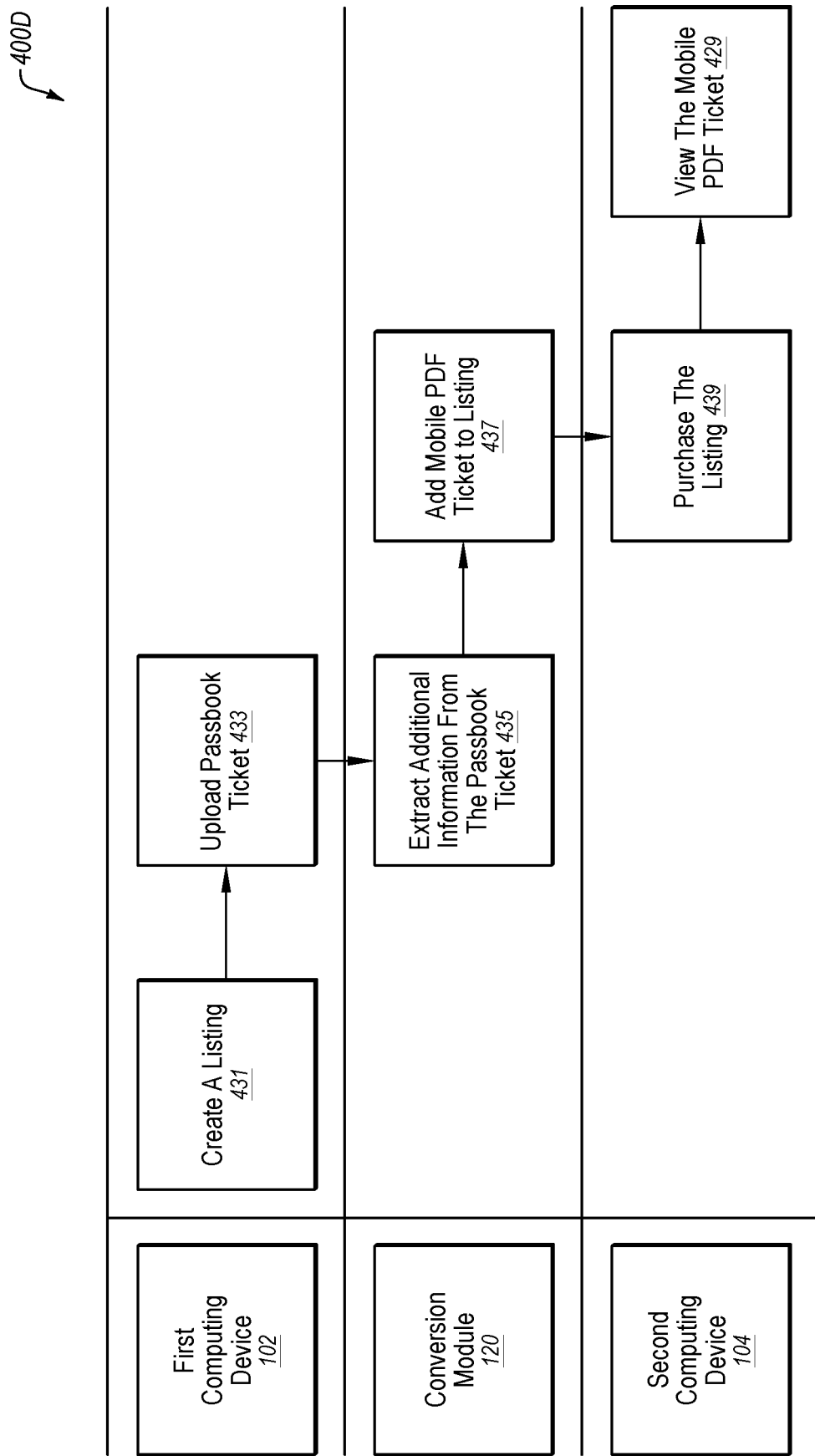
FIG. 4D illustrates an example sequence chart that represents an example sequence of operations that may be implemented in the conversion process of FIG. 3D.

FIG. 3D illustrates an example conversion process 300D in which the portion of ticket information 204 includes a mobile ticket from PASSBOOK® or another digital wallet application (in FIG. 3D, "passbook ticket 351"). FIG. 4D illustrates an example sequence chart 400D that represents an example sequence of operations that may be implemented in the conversion process 300D. The sequence chart 400D of FIG. 4D includes environmental components (e.g., the first computing device 102, the conversion module 120, and the buyer device 104) that may perform one or more operations (e.g., 431, 433, 435, 437, 439, and 429) positioned to the right of the environmental components.

The conversion process 300D is similar to the conversion process 300C described above. For instance, in the conversion process 300D and the sequence chart 400D, the first computing device 102 may be configured to create a listing 214 (operation 431 in FIG. 4D) for a ticket offered for sale. The first computing device 102 may communicate or upload the portion of ticket information 204, which includes the passbook ticket 351 (operation 433 in FIG. 4D), which is received by the secondary server 108.

In response to the portion of ticket information 204 including passbook ticket 351, the secondary server 108 may generate a mobile PDF ticket 207. The mobile PDF ticket 207 may be based on additional ticket information accessed by the secondary server 108, which may be related to the ticket and the event for which the ticket is issued and/or on the information included in the portion of ticket information 204. The mobile PDF ticket 207 is an example of the optimized ticket.

In some embodiments, the secondary server 108 may include the conversion module 120 that further includes a PDF creation module 329. The PDF creation module 329 may be configured to generate the mobile PDF ticket 207. The mobile PDF ticket 207 may be based on extracted additional information (operation 435 in FIG. 4D) such as a barcode in the passbook ticket 351 and a ticket template 327.

The PDF creation module 329 may add the mobile PDF ticket 207 to the listing 214 for the ticket on the marketplace application 206 hosted by the secondary server 108 (operation 437 in FIG. 4D). Accordingly, the buyer device 104 may be configured to access and view the mobile PDF ticket 207 while interfacing with the marketplace application 206.

In addition, the secondary server 108 may communicate the mobile PDF ticket 207 or a version thereof to the buyer device 104. The secondary server 108 may cause display of the mobile PDF ticket 207 or a version thereof on the buyer device 104 (operation 429 in FIG. 4D). For instance, the buyer device 104 may include a smart device that is interfacing with the marketplace application 206. During such interfacing, the secondary server 108 may cause the mobile PDF ticket 207 or a version thereof to display on the buyer device 104.

In some embodiments, generation of the mobile PDF ticket 207 may be in response to receipt at the secondary server 108 of user input that is used to indicate purchase of the ticket by the buyer device 104 (operation 439 in FIG. 4D). In some embodiments, the generation of the mobile PDF ticket 207 may occur in response to additional user input from the second computing device used to access the ticket following purchase of the ticket.

Figure 3E:
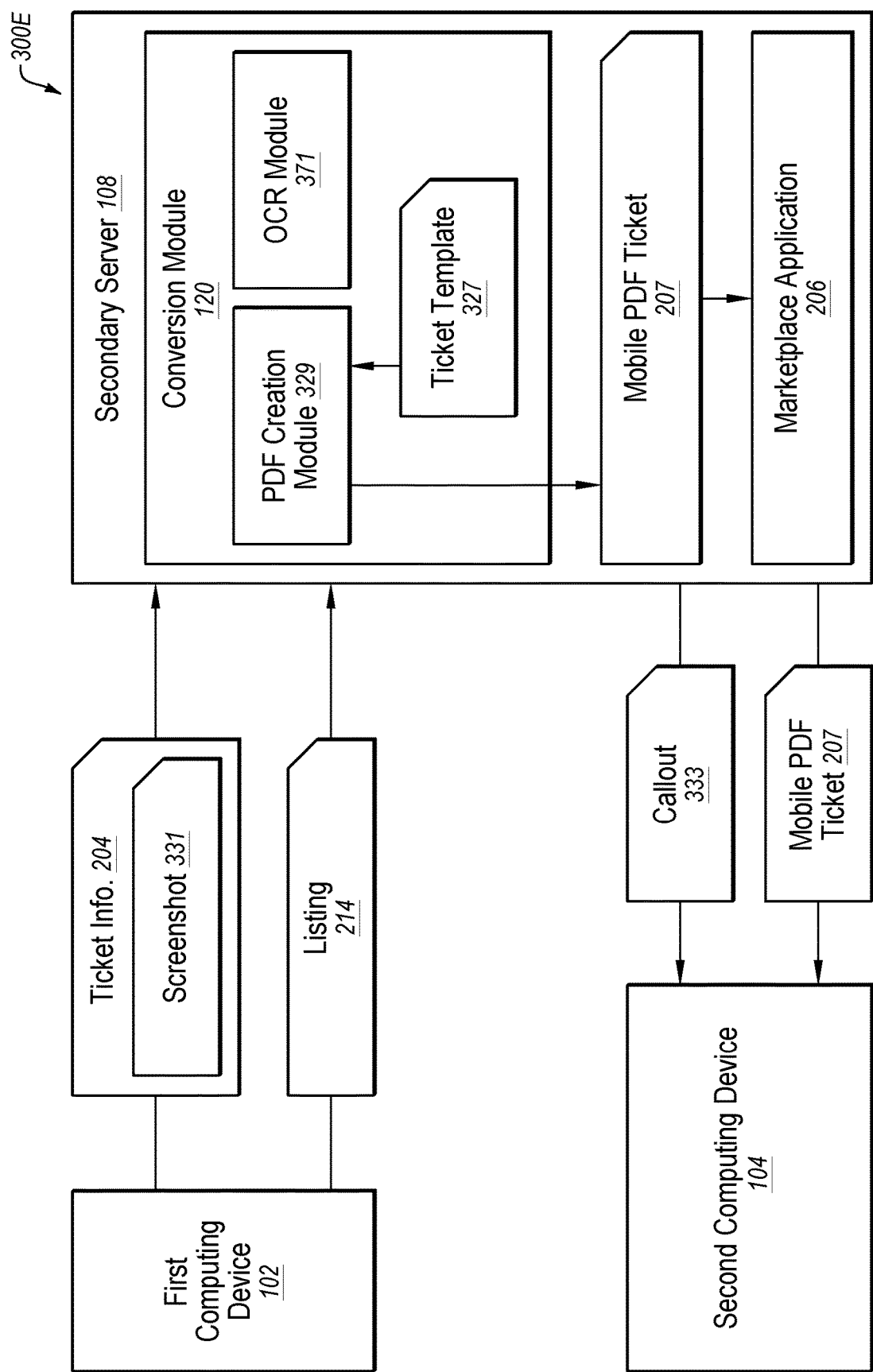
FIG. 3E illustrates another example conversion process that may be implemented in the operating environment of FIG. 1.
Figure 4E:
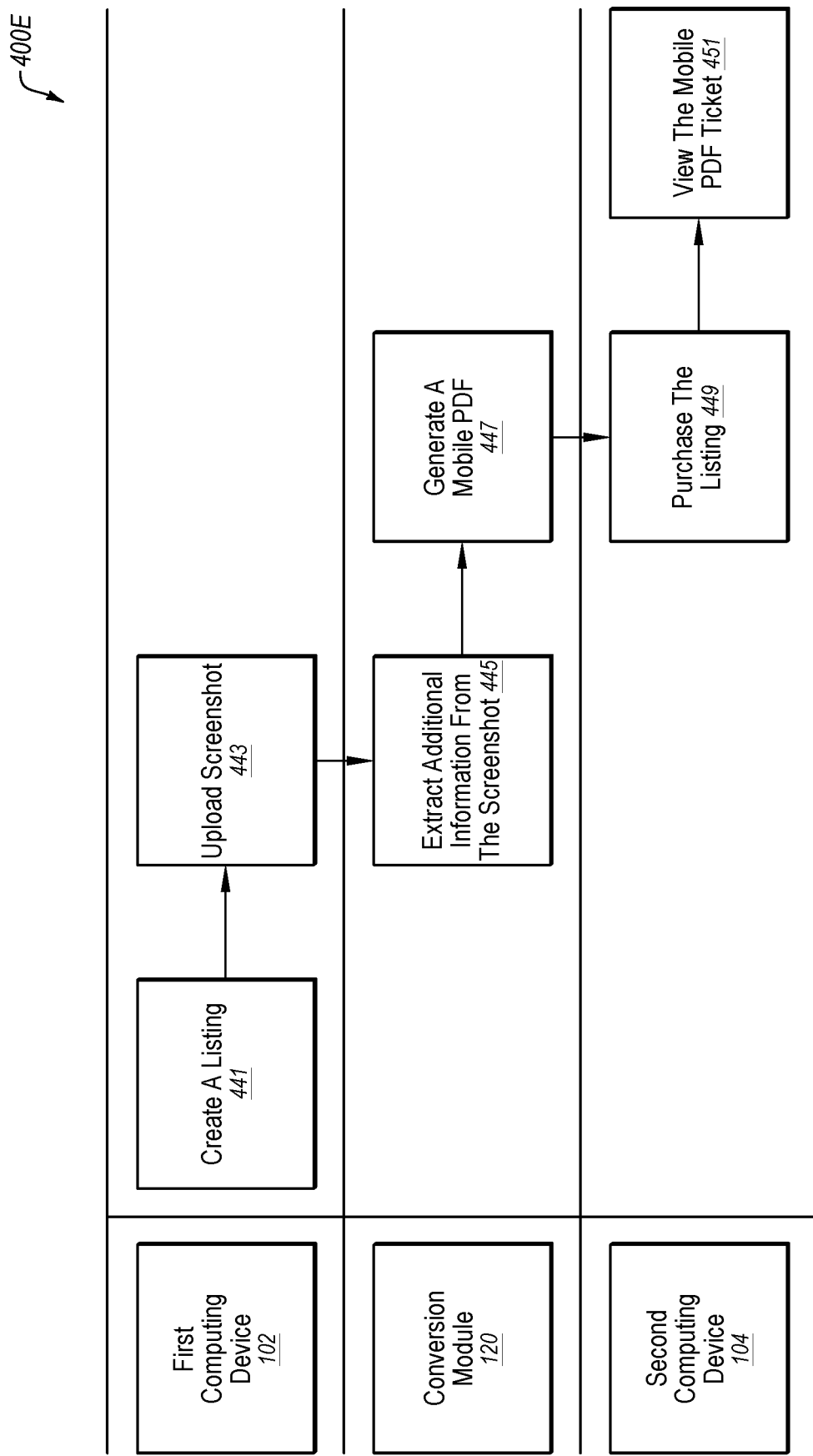
FIG. 4E illustrates an example sequence chart that represents an example sequence of operations that may be implemented in the conversion process of FIG. 3E.

FIG. 3E illustrates an example conversion process 300E in which the portion of ticket information 204 includes a screenshot of a mobile ticket 331 (in FIG. 3E, "screenshot 331"). FIG. 4E illustrates an example sequence chart 400E that represents an example sequence of operations that may be implemented in the conversion process 300E. The sequence chart 400E of FIG. 4E includes environmental components (e.g., the first computing device 102, the conversion module 120, and the buyer device 104) that may perform one or more operations (e.g., 441, 443, 445, 447, 449, and 451) positioned to the right of the environmental components.

In the conversion process 300E of FIG. 3E and the sequence chart 400E, the first computing device 102 may be configured to create a listing 214 (operation 441 in FIG. 4E). The listing 214 may be for a ticket offered for sale. Either during creation of the listing 214 or subsequent to the creation of the listing 214, the first computing device 102 may communicate or upload the portion of ticket information 204, which includes the screenshot 331 (operation 443 in FIG. 4E). The secondary server 108 may receive the portion of ticket information 204.

In response to the portion of ticket information 204 including the screenshot 331, the secondary server 108 may generate a mobile PDF ticket 207. The mobile PDF ticket 207 may be based on additional ticket information accessed by the secondary server 108, which may be related to the ticket and the event for which the ticket is issued and/or on the information included in the portion of ticket information 204. The mobile PDF ticket 207 is an example of the optimized ticket.

In some embodiments, the secondary server 108 may include the conversion module 120 that further includes a PDF creation module 329 and an optical character recognition (OCR) module 371. The OCR module 371 may be configured to extract the additional ticket information from the screenshot 331 (operation 445 in FIG. 4E). The additional information may include a barcode, event information, ticket information, etc. that may be extracted from the screenshot 331.

The PDF creation module 329 may be configured to generate the mobile PDF ticket 207 (operation 447 in FIG. 4E). The generation of the mobile PDF ticket 207 may be based on extracted additional ticket information such as the barcode and a ticket template 327. The ticket template 327 may be consistently applied to some or all of the mobile PDF tickets 207 generated by the conversion module 120.

The mobile PDF ticket 207 or a version thereof may be added to the listing 214 for the ticket on the marketplace application 206 hosted by the secondary server 108. Accordingly, the buyer device 104 may be configured to access and view the mobile PDF ticket 207. For instance, the buyer device 104 may include a desktop computer. A buyer (e.g., the buyer 117 described above) may view the mobile PDF ticket 207 while interfacing with the marketplace application 206. In addition, the secondary server 108 may communicate the mobile PDF ticket 207 or a version thereof to the buyer device 104. The secondary server 108 may cause display of the mobile PDF ticket 207 or a version thereof on the buyer device 104 (operation 451 in FIG. 4E). For instance, the buyer device 104 may include a smart device that is interfacing with the marketplace application 206. During such interfacing, the secondary server 108 may cause the mobile PDF ticket 207 or a version thereof to display on the buyer device 104.

In some embodiments, generation of the mobile PDF ticket 207 may be in response to receipt at the secondary server 108 of user input that is used to indicate purchase of the ticket by the buyer device 104 (operation 449 in FIG. 4E). In some embodiments, the generation of the mobile PDF ticket 207 may occur in response to additional user input from the second computing device used to access the ticket following purchase of the ticket.

The secondary server 108 may communicate a callout 333 to the buyer device 104. The callout 333 may be configured to inform a buyer associated with the buyer device 104 of a restriction of use of the mobile PDF ticket 207 at a venue. For example, some venues may require a mobile ticket. Accordingly, the callout 333 may inform the buyer that a mobile ticket is required at the venue. The secondary server 108 may be configured to store and update restrictions particular to one or more venues.

Figure 5:
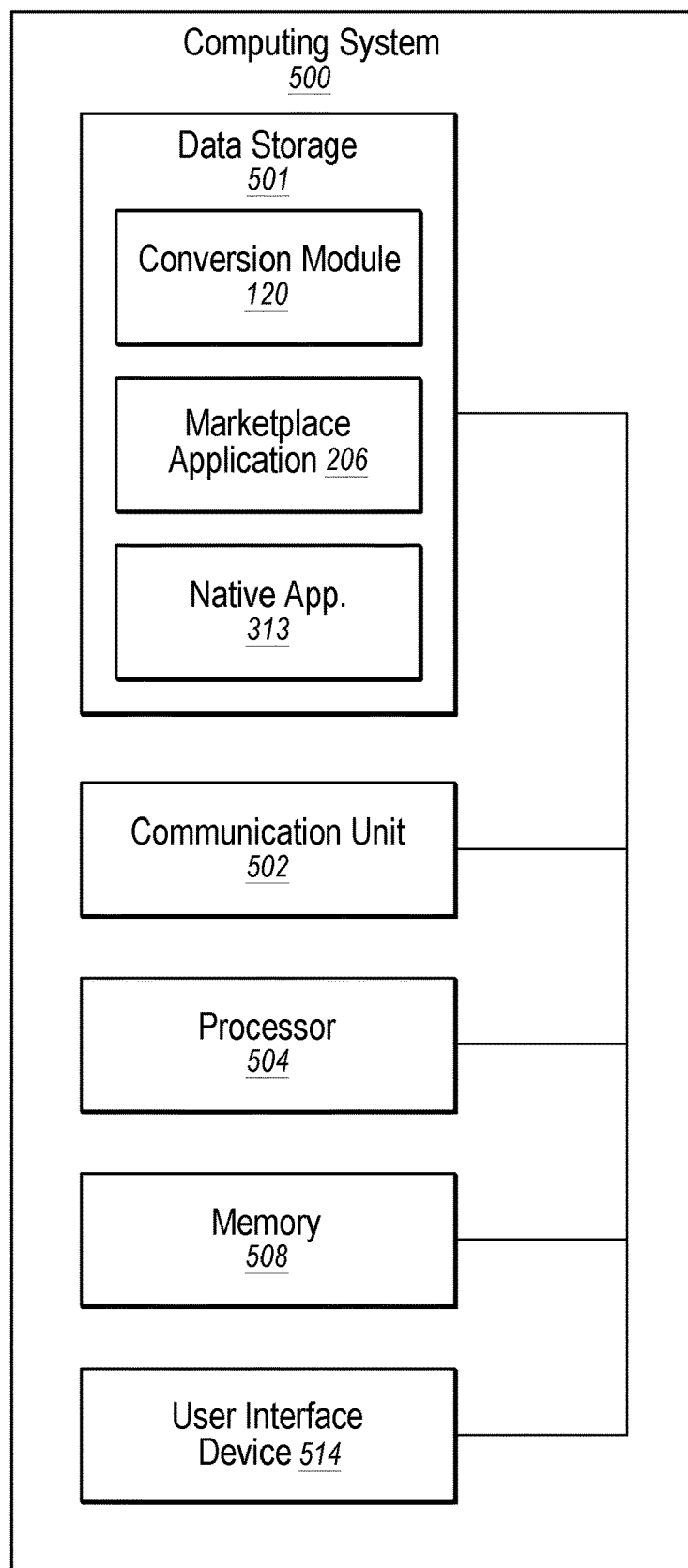
FIG. 5 illustrates an example computing system configured for electronic file conversion that may be implemented in the marketplace environment of FIG. 1.

FIG. 5 illustrates an example computing system 500 configured for conversion that may be implemented in the operating environment 100. Examples of the computing system 500 may include one or more of the buyer device 104, the first computing device 102, the primary server 106, the secondary server 108, and the venue server 112.

The computing system 500 may include one or more processors 504, a memory 508, a data storage 501 that includes the conversion module 120, the native application 313, and the marketplace application 206 (collectively, "modules/applications 120/313/206"), a communication unit 502, and a user interface device 514.

The processor 504 may include any suitable special-purpose or general-purpose computer, computing entity, or processing device including various computer hardware or software modules and may be configured to execute instructions stored on any applicable computer-readable storage media. For example, the processor 504 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 5, the processor 504 may more generally include any number of processors configured to perform individually or collectively any number of operations described in the present disclosure. Additionally, one or more of the processors 504 may be present on one or more different electronic devices or computing systems. In some embodiments, the processor 504 may interpret and/or execute program instructions and/or process data stored in the memory 508, the data storage 501, or the memory 508 and the data storage 501. In some embodiments, the processor 504 may fetch program instructions from the data storage 501 and load the program instructions in the memory 508. After the program instructions are loaded into the memory 508, the processor 504 may execute the program instructions.

The memory 508 and data storage 501 may include computer-readable storage media for carrying or having computer-executable instructions or data structures stored thereon. Such computer-readable storage media may include any available media that may be accessed by a general-purpose or special-purpose computer, such as the processor 504. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 504 to perform a certain operation or group of operations.

The communication unit 502 may include one or more pieces of hardware configured to receive and send communications. In some embodiments, the communication unit 502 may include one or more of an antenna, a wired port, and modulation/demodulation hardware, among other communication hardware devices. In particular, the communication unit 502 may be configured to receive a communication from outside the computing system 500 and to present the communication to the processor 504 or to send a communication from the processor 504 to another device or network.

The user interface device 514 may include one or more pieces of hardware configured to receive input from and/or provide output to a user. In some embodiments, the user interface device 514 may include one or more of a speaker, a microphone, a display, a keyboard, and a touch screen, a holographic projection, among other hardware devices. In these and other embodiments, the user interface device 514 may be configured to receive input from a user (e.g., the buyer 117 or the seller 116) of the computing system 500.

The modules/applications 120/313/206 may include program instructions stored in the data storage 501. The processor 504 may be configured to load the modules/applications 120/313/206 into the memory 508 and execute the modules/applications 120/313/206. When executing the modules/applications 120/313/206, the processor 504 may be configured to perform operations of ticket or file conversion and/or ticket or file transfer as described elsewhere in this disclosure.

Modifications, additions, or omissions may be made to the computing system 500 without departing from the scope of the present disclosure. For example, in some embodiments, the computing system 500 may not include the user interface device 514. In some embodiments, the different components of the computing system 500 may be physically separate and may be communicatively coupled via any suitable mechanism. For example, the data storage 501 may be part of a storage device that is separate from a server, which includes the processor 504, the memory 508, and the communication unit 502, that is communicatively coupled to the storage device.

Figure 6:
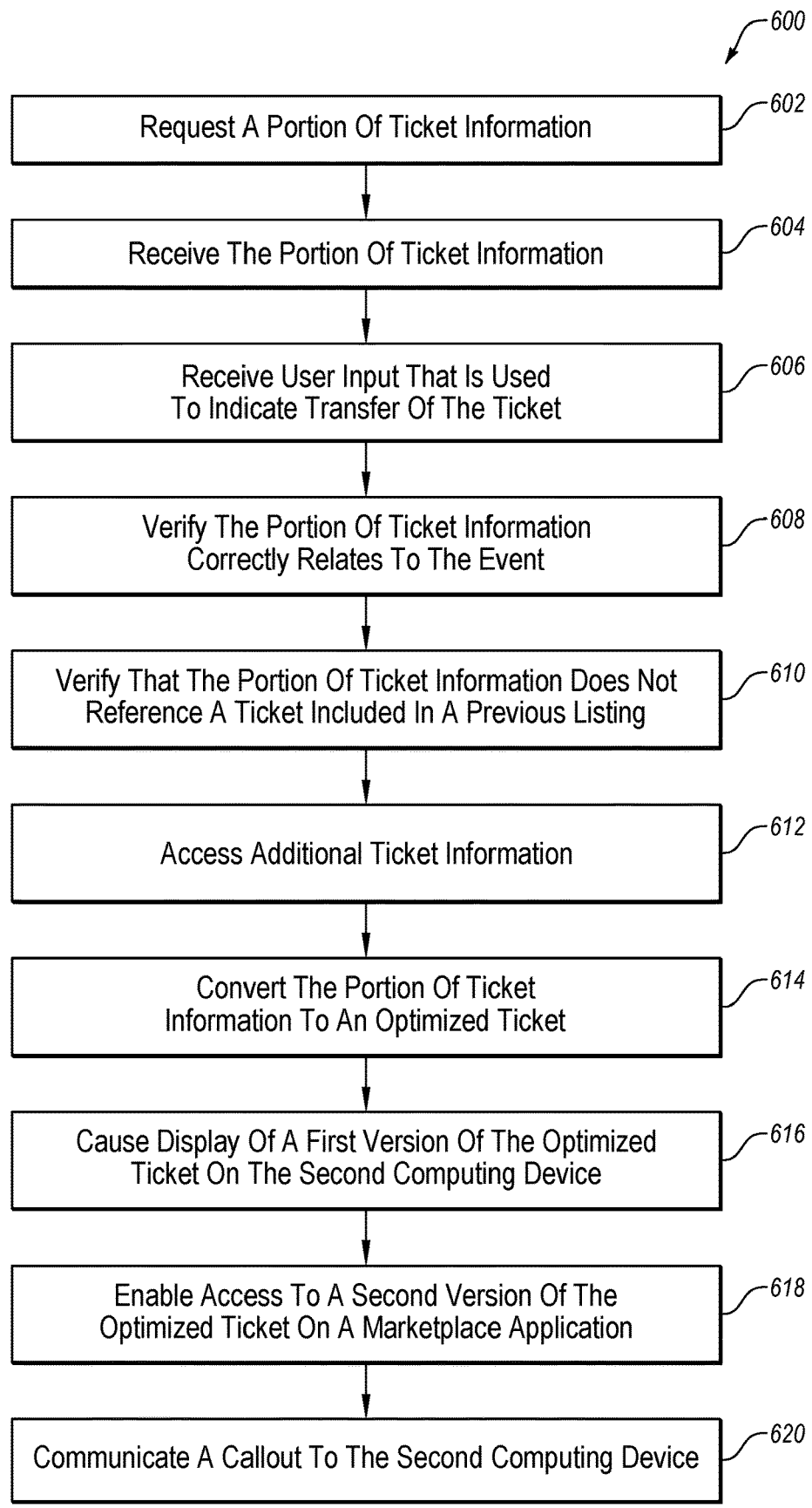
FIG. 6 is a flowchart of an example method of online ticket transfer.

FIG. 6 is a flow chart of an example method 600 of online ticket transfer, arranged in accordance with at least one embodiment described in this disclosure. Although illustrated as discrete blocks, various blocks may be divided into additional blocks, combined into fewer blocks, or eliminated, depending on the desired implementation.

The method 600 may begin at block 602 in which a portion of ticket information may be requested. The portion of the ticket information may be requested following receipt of information used for generation of a ticket listing for a ticket for sale on an online ticket marketplace.

At block 604, the portion of ticket information may be received. For example, a secondary server may receive the portion of ticket information. The portion of ticket information may relate to a ticket for sale. The portion of ticket information may be received from a first computing device that is associated with a first entity, for instance a first computing device that is associated with a seller.

At block 606, user input may be received that is used to indicate transfer of the ticket. The user input may be received at the secondary server. The user input may be received from a second computing device that is associated with a second entity. For instance the user input may be received from a buyer device that is associated with a buyer.

At block 608, the portion of ticket information may be verified. For instance, the secondary server may verify the portion of ticket information correctly relates to the event for which the ticket is issued. For example, the portion of ticket information may refer to an event that occurs at a different venue. Verification of the portion of ticket information may reduce such errors.

At block 610, the portion of ticket information may be verified such that it does not reference a ticket included in a previous listing. For instance, the secondary server may verify that the portion of ticket information is not for an event that has already occurred and/or that the same ticket has not been listed multiple times. Verification may reduce fraud and errors.

At block 612, additional ticket information may be accessed. The additional ticket information may be related to the ticket and an event for which the ticket is issued. For instance, the secondary server may access additional ticket information related to the ticket and an event for which the ticket is issued. In some embodiments, the secondary server may access additional ticket information in response to additional user input from the second computing device used to access the ticket following transfer of the ticket.

At block 614 the portion of ticket information may be converted to an optimized ticket. The portion of ticket information may be converted to an optimized ticket based on the information included in the portion of ticket information. For example, the secondary server may convert the portion of ticket information to the optimized ticket based on the information included in the portion of ticket information. At least a version of the optimized ticket may be formatted for display on the second computing device. In some embodiments, conversion may be performed in response to the additional user input from the second computing device used to access the ticket following transfer of the ticket. In some embodiments, the optimized ticket may include the portion of ticket information and the additional ticket information.

At block 616, display of a first version of the optimized ticket may be caused. For example, display of the first version of the optimized ticket may be caused to be displayed on the second computing device. At block 618, access to a second version of the optimized ticket may be enabled. For example, access to the second version may be enabled on a marketplace application hosted by the secondary server. At block 620, a callout may be communicated to the second computing device. The callout being configured to inform the second entity of a restriction of use of the mobile PDF ticket at a venue.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
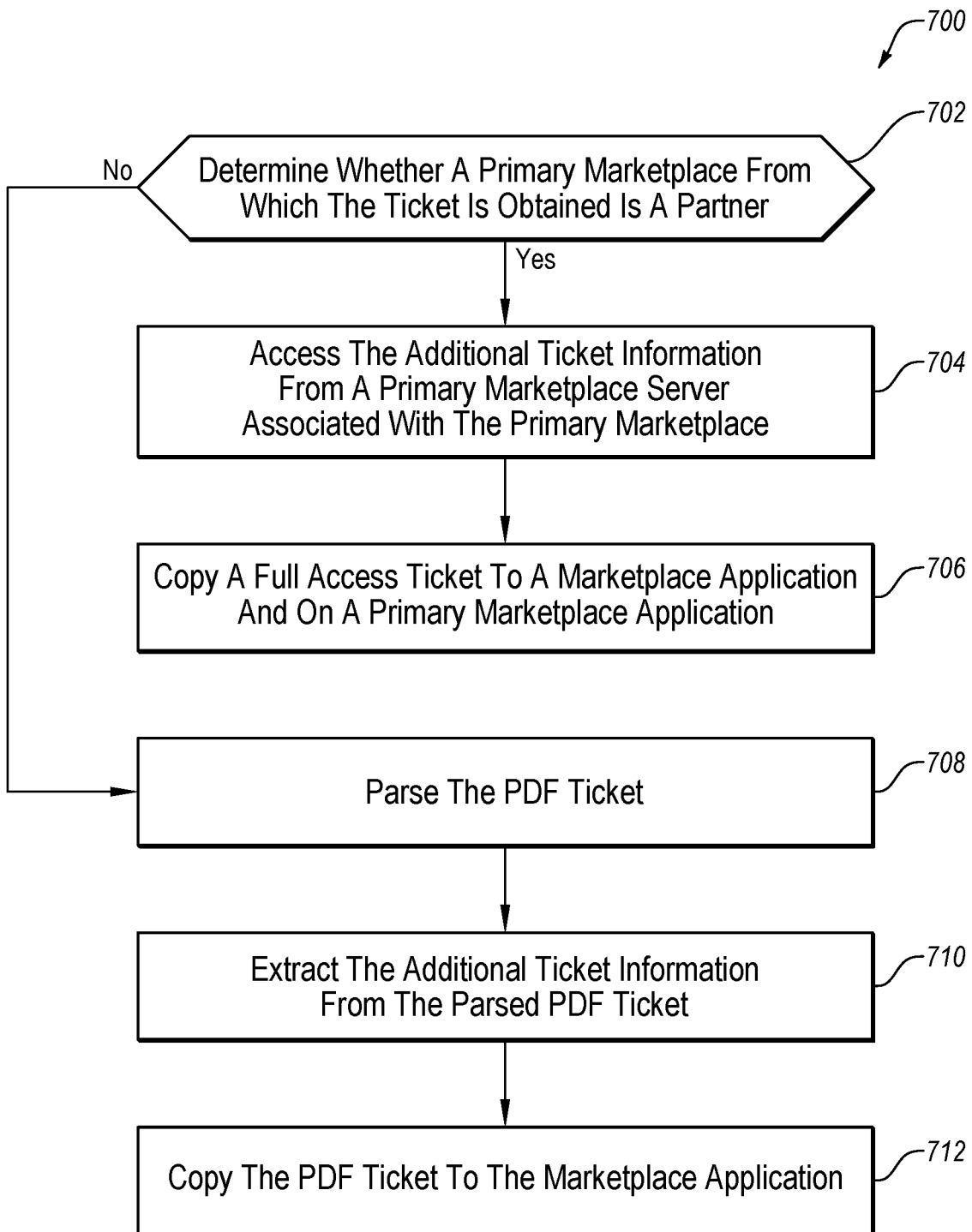
FIG. 7 is a flowchart of an example method of converting a portion of ticket information.

FIG. 7 is a flowchart of an example method 700 of converting a portion of ticket information, according to at least one embodiment described in this disclosure. Although illustrated as discrete blocks, various blocks may be divided into additional blocks, combined into fewer blocks, or eliminated, depending on the desired implementation. In some embodiments, the method 700 may be performed in response to the portion of ticket information including a PDF ticket. For example, in block 601 of method 600 the requested portion of ticket information may include a PDF ticket. The method 700 may be performed in response to the portion of ticket information including a PDF ticket.

The method 700 may begin at block 702 in which it may be determined whether a primary marketplace from which the ticket is obtained is a partner. By being the partner, the primary marketplace may allow sharing or may share ticket information with the secondary ticket marketplace. In response to the primary marketplace being a partner ("YES" at block 702), the method 700 may proceed to block 704. In response to the primary marketplace not being a partner ("NO" at block 702), the method 700 may proceed to block 708.

At block 704, additional ticket information may be accessed from a primary server. The primary server may be associated with the primary marketplace. At block 706, a full access ticket may be copied to a marketplace application and a primary marketplace application. The marketplace application may be hosted by the secondary server and the primary marketplace application may be hosted by the primary server.

In some embodiments in which the portion of ticket information includes the PDF ticket and the primary marketplace is a partner, the optimized ticket may include a first version that includes a digital mobile device ticket. The digital mobile device ticket may include a barcode accessed from the primary server. The digital mobile device ticket may be formatted according to a standard mobile device ticket issued by the primary server for the event.

At block 708, the PDF ticket may be parsed. For example, the information on the PDF ticket may be read and content thereof may be reviewed. At block 710, the additional ticket information may be extracted from the parsed PDF ticket. At block 712, the PDF ticket may be copied to the marketplace application.

In some embodiments in which the portion of ticket information includes the PDF ticket and the primary marketplace is not a partner, the optimized ticket includes a first version that includes a digital mobile device ticket. The digital mobile device ticket may include a barcode parsed from the PDF ticket. The digital mobile device ticket may be formatted according to a standard mobile device ticket issued by the primary server for the event.

Figure 8:
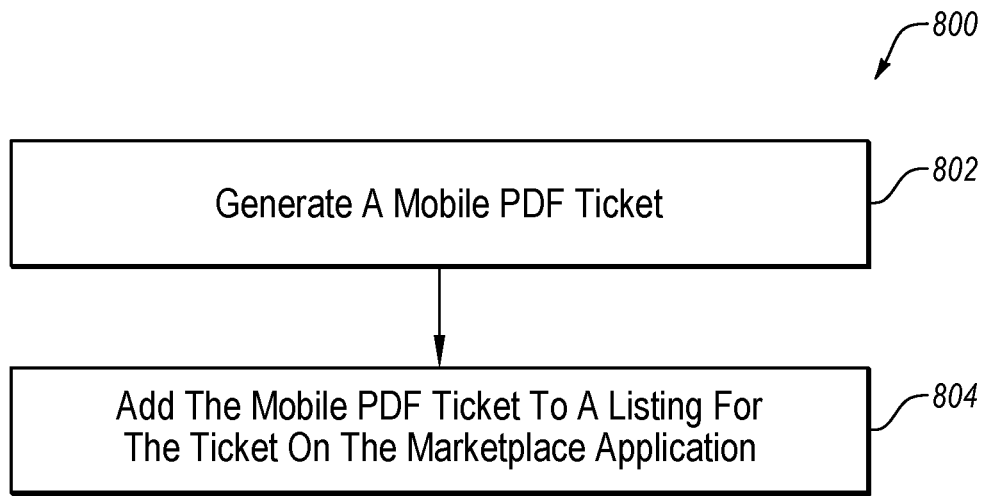
FIG. 8 is a flowchart of another example method of converting a portion of ticket information.

FIG. 8 is a flowchart of an example method 800 of converting a portion of ticket information, according to at least one embodiment described in this disclosure. Although illustrated as discrete blocks, various blocks may be divided into additional blocks, combined into fewer blocks, or eliminated, depending on the desired implementation. In some embodiments, the method 800 may be performed in response to the portion of ticket information including a barcode from a mobile ticket issued from a primary marketplace or a mobile ticket in a digital wallet such as PASSBOOK®. For example, in block 601 of method 600 the requested portion of ticket information may include a barcode from a mobile ticket issued from a primary marketplace or a mobile ticket in a digital wallet such as PASSBOOK®. The method 800 may be performed in response to the portion of ticket information including a barcode from a mobile ticket issued from a primary marketplace or a mobile ticket in a digital wallet such as PASSBOOK®.

The method 800 may begin at block 802 in which a mobile PDF ticket may be generated. The mobile PDF ticket may be generated using the barcode, the additional ticket information, and a ticket template. At block 804, the mobile PDF ticket may be added to a listing for the ticket on the marketplace application. As described above, the marketplace application may be hosted by the secondary server. In some embodiments in which the portion of ticket information includes a barcode from a mobile ticket issued from a primary marketplace or a mobile ticket in a digital wallet, the optimized ticket may include a first version that is the mobile PDF ticket.

Figure 9:
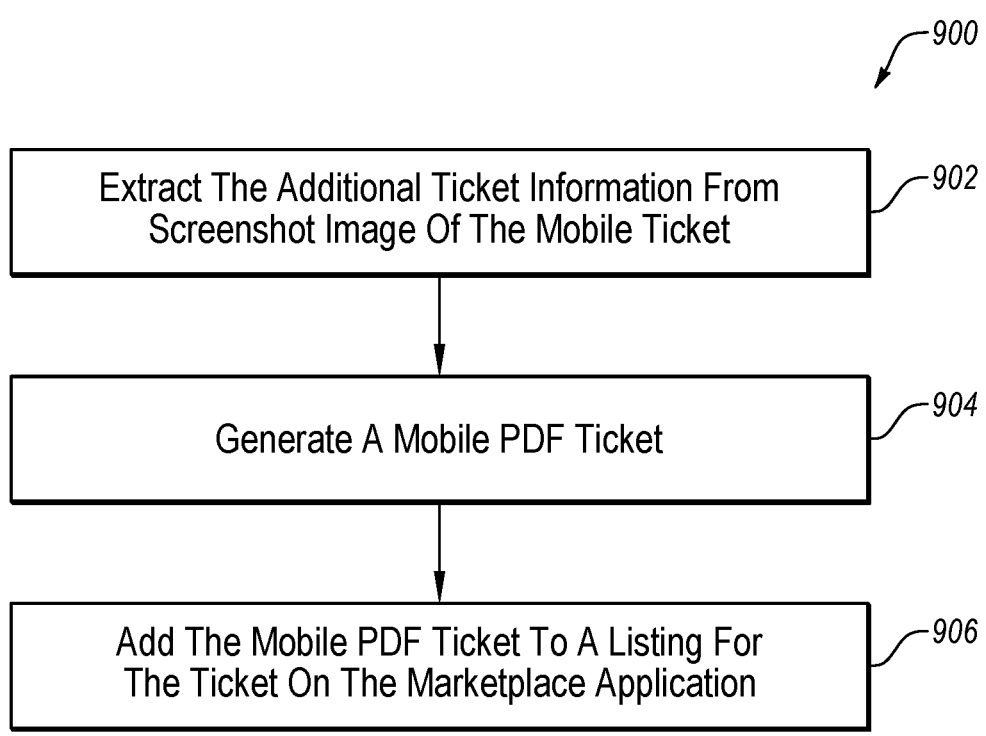
FIG. 9 is a flowchart of another example method of converting a portion of ticket information.

FIG. 9 is a flowchart of an example method 900 of converting a portion of ticket information, according to at least one embodiment described in this disclosure. Although illustrated as discrete blocks, various blocks may be divided into additional blocks, combined into fewer blocks, or eliminated, depending on the desired implementation. In some embodiments, the method 900 may be performed in response to the portion of ticket information including a screenshot image of a mobile ticket issued from the primary marketplace. For example, in block 602 of method 600 the requested portion of ticket information may include a screenshot image of a mobile ticket issued from the primary marketplace. The method 900 may be performed in response to the portion of ticket information including a screenshot image of a mobile ticket issued from the primary marketplace.

The method 900 may begin at block 902 in which additional ticket information may be extracted from a screenshot image of the mobile ticket. The additional ticket information may be extracted using an OCR technology implemented to read data in the screenshot image. At block 904, a mobile PDF ticket may be generated. The mobile PDF ticket may be generated using the barcode, the additional ticket information, and a ticket template, in some embodiments. At block 906, the mobile PDF ticket may be added to a listing for the ticket on the marketplace application. The marketplace application may be hosted by the secondary server. In some embodiments in which the portion of ticket information includes a screenshot image of a mobile ticket issued from the primary marketplace, the optimized ticket includes a first version that is the mobile PDF ticket.

Figure 10:
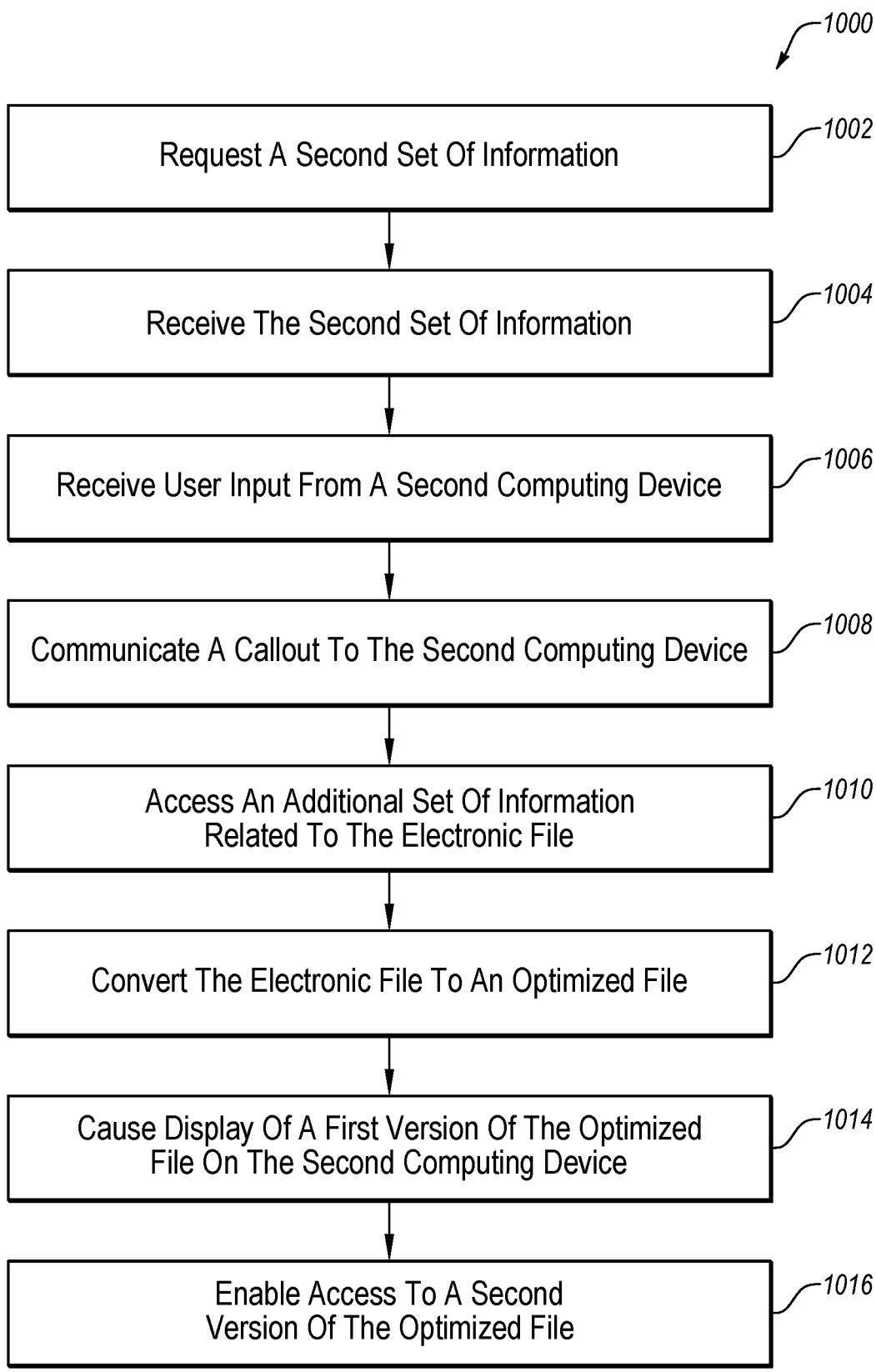
FIG. 10 is a flowchart of an example method of electronic file format conversion, all according to an embodiment described in this disclosure.

FIG. 10 is a flowchart of an example method 1000 of electronic file format conversion, arranged in accordance with at least one embodiment described in this disclosure. Although illustrated as discrete blocks, various blocks may be divided into additional blocks, combined into fewer blocks, or eliminated, depending on the desired implementation.

The method 1000 may begin at block 1002 in which a second set of information may be requested. The second set of information may be requested by a secondary server. The second set of information may be requested following receipt of a first set of information used to transfer an electronic file on a website. In some embodiments, the second set of information that is requested is based on an entity type of the first entity. For example, the second set of information that is requested may be based on whether the first entity is trusted. At block 1004, the second set of information may be received. The second set of information may be received at the secondary server. The second set of information may be received from a first computing device that is associated with a first entity At block 1006, user input may be received. The user input may be received at the secondary server that may be associated with a second entity. The user input may initialize transfer of the electronic file from the first computing device to the second computing device. At block 1008, a callout may be communicated. The callout may be communicated to the second computing device. The callout may be configured to inform the second entity of a restriction of use of the file.

At block 1010, an additional set of information may be accessed. The additional set of information may be accessed by the secondary server. The additional set of information may be related to the electronic file. The additional set of information may be accessed in response to additional user input from the second computing device used to access the electronic file. At block 1012, the electronic file may be converted to an optimized file. The electronic file may be converted based on the second set of information and/or the additional set of information. In some embodiments, at least a version of the optimized file is formatted for display on the second computing device. The electronic file may be converted in response to the additional user input from the second computing device used to access the electronic file.

In some embodiments, in response to the first information including a screenshot image of the file as issued from a primary marketplace, the converting may include extracting the additional information from a screenshot image of the file; and generating a mobile PDF file using a barcode from the screenshot image, the additional ticket information, and a file template.

At block 1014, display of a first version of the optimized file may be caused. The display of the first version of the optimized file may be displayed on the second computing device. At block 1016, access to a second version of the optimized file may be enabled. The access to the second version may be enabled on an application hosted by the secondary server.

The methods 600, 700, 800, 900, and 1000 may be implemented, in some embodiments, by a computing device or computing system, such as the secondary server 108 discussed in this disclosure or the computing system 500 discussed with reference to FIG. 5. In some embodiments, the secondary server 108 or the computing system 500 may include or may be communicatively coupled to a non-transitory computer-readable medium (e.g., the memory 508 of FIG. 5) having stored thereon programming code or instructions (e.g., the conversion module 120 of FIG. 5) that are executable by a processor (such as the processor 504 of FIG. 5) to cause the marketplace server or the computing system 500 to perform the methods 600, 700, 800, 900, and 1000. Additionally or alternatively, the secondary server 108 or the computing system 500 may include the processor 504 described above that is configured to execute computer instructions to cause the secondary server 108 or the computing system 500 or another computing device to perform the methods 600, 700, 800, 900, and 1000.

As indicated above, the embodiments described herein may include the use of a special purpose or general purpose computer (e.g., the processor 504 of FIG. 5) including various computer hardware or software modules, as discussed in greater detail below. Further, as indicated above, embodiments described herein may be implemented using computer-readable media (e.g., the memory 508 of FIG. 5) for carrying or having computer-executable instructions or data structures stored thereon.

As used herein, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of electronic file format conversion, the method comprising:
following receipt of first information associated with a transfer of an electronic file, requesting, by a secondary server associated with a secondary marketplace, second information;
receiving, at the secondary server, the second information;
receiving, at the secondary server, a user input indicative of a transaction with the electronic file from a computing device associated with a user;
determining, by the secondary server, that a primary marketplace is partnered with the secondary marketplace;
in response to the secondary server determining that the primary marketplace is partnered with the secondary marketplace, accessing, by the secondary server, additional information related to the electronic file from a primary server associated with the primary marketplace; and
based on the second information and the additional information, converting, by the secondary server, the electronic file to a converted file, wherein the converted file includes the second information and the additional information, and wherein the second information and the additional information associate the user with the converted file.

2. The method of claim 1, further comprising:
causing display of a first version of the converted file on the computing device associated with the user; and
enabling access to a second version of the converted file on an application hosted by the secondary server.

3. The method of claim 1, further comprising communicating a callout to the computing device associated with the user, wherein the callout is configured to inform the user of a restriction of use of the converted file.

4. The method of claim 1, further comprising:
in response to the second information including a screenshot image of a representation of at least a portion of the electronic file as issued from the primary marketplace, the converting includes:
extracting a barcode from the screenshot image; and
generating a mobile PDF file using the barcode from the screenshot image, the additional information, and a file template.

5. The method of claim 1, wherein the second information that is requested is based on an entity type of an entity from which the second information is received.

6. A method of ticket format conversion, the method comprising:
following receipt of information associated with a listing for a ticket on an online ticket marketplace, requesting, by a secondary server associated with a secondary marketplace, a portion of ticket information;
receiving, at the secondary server, the portion of ticket information relating to the ticket;
receiving, at the secondary server, a user input indicative of a purchase of the ticket from a computing device associated with a user;
determining, by the secondary server, that a primary marketplace is partnered with the secondary marketplace;
in response to the secondary server determining that the primary marketplace is partnered with the secondary marketplace, accessing, by the secondary server, additional ticket information related to the ticket from a primary server associated with the primary marketplace; and
based on the portion of ticket information and the additional ticket information, converting, by the secondary server, the portion of ticket information to a converted ticket, wherein the converted ticket includes the portion of ticket information and the additional ticket information, and wherein the portion of ticket information and the additional ticket information associate the user with the converted ticket.

7. The method of claim 6, further comprising:
causing display of a first version of the converted ticket on the computing device associated with the user; and
enabling access to a second version of the converted ticket on a marketplace application hosted by the secondary server.

8. The method of claim 6, further comprising:
verifying the portion of ticket information correctly relates to an event for which the ticket is issued, and
verifying that the portion of ticket information does not reference a second ticket included in a previous listing.

9. The method of claim 6, wherein in response to the portion of ticket information including a digital portable document format (PDF) ticket, the converting includes copying a full access ticket to a marketplace application hosted by the secondary server and on a primary marketplace application hosted by the primary server, wherein the converted ticket includes a first version that includes a digital mobile device ticket with a barcode accessed from the primary server and that is formatted according to a standard mobile device ticket issued by the primary server.

10. The method of claim 6, wherein in response to the portion of ticket information including a digital portable document format (PDF) ticket, wherein the converted ticket includes a first version that includes a digital mobile device ticket with a barcode parsed from a PDF ticket and that is formatted according to a standard mobile device ticket issued by the primary server.

11. The method of claim 6, further comprising communicating a callout to the computing device associated with the user, the callout being configured to inform the user of a restriction of use of a mobile portable document format (PDF) ticket at a venue.

12. The method of claim 6, further comprising in response to the portion of ticket information including a screenshot image of a mobile ticket issued from the primary marketplace, the converting includes:
extracting a barcode from the screenshot image;
generating a mobile PDF ticket using the barcode from the screenshot image, the additional ticket information, and a ticket template; and
adding the mobile PDF ticket to an application listing for the ticket on a marketplace application hosted by the secondary server.

13. A system comprising:
one or more processors; and
one or more computer-readable storage media communicatively coupled to the one or more processors and storing instructions that, in response to execution by the one or more processors, cause a component to perform operations of the method of claim 6.

14. Non-transitory computer-readable media storing a program that is configured in response to execution by a processor, to cause a computing system to execute operations comprising:
requesting, by a secondary server associated with a secondary marketplace, a portion of ticket information;
receiving, at the secondary server, the portion of ticket information relating to a ticket;

determining, by the secondary server, that a primary marketplace from which the ticket is obtained is a partner of the secondary marketplace;
receiving, at the secondary server, a user input indicative of a purchase of the ticket from a computing device associated with a user;
accessing additional ticket information from a primary server associated with the primary marketplace, the additional ticket information being related to the ticket;
copying a full access ticket to a marketplace application hosted by the secondary server and on a primary marketplace application hosted by the primary server;
creating a mobile ticket based on the full access ticket; and
assigning the user as an owner of the mobile ticket.

15. The non-transitory computer-readable media of claim 14, wherein the creating the mobile ticket is performed in response to user input from a computing device used to access the ticket following transfer of the ticket.

16. The non-transitory computer-readable media of claim 15, wherein the operations further comprise:
causing display of a first version of the mobile ticket on the computing device used to access the ticket following transfer of the ticket; and
enabling access to a second version of the mobile ticket on the marketplace application.

17. The non-transitory computer-readable media of claim 14, wherein the operations further comprise:
verifying the portion of ticket information correctly relates to an event for which the ticket is issued, and
verifying that the portion of ticket information does not reference a second ticket included in a previous listing.

18. The non-transitory computer-readable media of claim 14, wherein the portion of ticket information that is requested is based on an entity type of an entity from which the portion of ticket information is received.

19. A system comprising:
the computing system; and
the non-transitory computer-readable media of claim 14.

20. The non-transitory computer-readable media of claim 14, further comprising:
in response to the portion of ticket information including a barcode issued from the primary marketplace:
generating a mobile portable document format (PDF) ticket using the barcode, the additional ticket information, and a ticket template; and
adding the mobile PDF ticket to a listing for the ticket on the marketplace application hosted by the secondary server; and
in response to the portion of ticket information including a screenshot image of the mobile ticket:
extracting supplementary ticket information from the screenshot image of the mobile ticket;
generating a mobile PDF ticket using the barcode, the supplementary ticket information, and the ticket template; and
adding the mobile PDF ticket to an application listing for the ticket on the marketplace application hosted by the secondary server.

* * * * *